United States Patent
Joseph et al.

(10) Patent No.: US 11,546,911 B2
(45) Date of Patent: Jan. 3, 2023

(54) ENHANCEMENTS TO SUPPORT MULTIPLE SEMI-PERSISTENT RESOURCE ALLOCATIONS PER SERVING CELL

(71) Applicant: QUALCOMM Incorporated, San Diego, CA (US)

(72) Inventors: Vinay Joseph, San Diego, CA (US); Linhai He, San Diego, CA (US); Rajat Prakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 180 days.

(21) Appl. No.: 16/751,814

(22) Filed: Jan. 24, 2020

(65) Prior Publication Data

US 2020/0245335 A1    Jul. 30, 2020

Related U.S. Application Data

(60) Provisional application No. 62/796,280, filed on Jan. 24, 2019.

(51) Int. Cl.
   *H04W 72/04* (2009.01)
   *H04W 76/11* (2018.01)
   (Continued)

(52) U.S. Cl.
   CPC ....... *H04W 72/0493* (2013.01); *H04L 5/0055* (2013.01); *H04L 5/0098* (2013.01);
   (Continued)

(58) Field of Classification Search
   CPC . H04W 72/0493; H04W 76/11; H04W 76/27; H04W 72/042; H04W 72/10; H04W 80/02; H04L 5/0055; H04L 5/0098
   See application file for complete search history.

(56) References Cited

U.S. PATENT DOCUMENTS 11,265,920 B2 *    3/2022  Jin ................... H04W 74/0833
2017/0295594 A1*  10/2017  Ozturk ................ H04L 5/0053
(Continued)

FOREIGN PATENT DOCUMENTS

EP     3422788 A1      1/2019
WO   WO-2019138360 A1 *  7/2019 ........... H04B 7/0626

OTHER PUBLICATIONS

International Search Report and Written Opinion—PCT/US2020/014981—ISA/EPO—dated Jun. 29, 2020.

*Primary Examiner* — Michael J Moore, Jr.
(74) *Attorney, Agent, or Firm* — Patterson + Sheridan, L.L.P.

(57) ABSTRACT

Certain aspects of the present disclosure provide techniques for supporting multiple semi-persistent resource allocations per serving cell. Embodiments include determining an association between one or more semi-persistent resource allocations and one or more identifiers. Embodiments include receiving signaling indicating activation or deactivation of at least one of the one or more semi-persistent resource allocations. Embodiments include determining an identifier of the at least one of the one or more semi-persistent resource allocations based on the association. Embodiments include sending an acknowledgment of the activation or deactivation. The acknowledgment may indicate the identifier of the at least one of the one or more semi-persistent resource allocations.

24 Claims, 16 Drawing Sheets

(51) Int. Cl.
    *H04W 76/27*     (2018.01)
    *H04L 5/00*     (2006.01)
    *H04W 72/10*     (2009.01)
    *H04W 80/02*     (2009.01)

(52) U.S. Cl.
    CPC ......... *H04W 72/042* (2013.01); *H04W 72/10* (2013.01); *H04W 76/11* (2018.02); *H04W 76/27* (2018.02); *H04W 80/02* (2013.01)

(56) References Cited

U.S. PATENT DOCUMENTS

| | | | |
|---|---|---|---|
| 2017/0332358 A1* | 11/2017 | Park | H04W 72/1289 |
| 2018/0049193 A1* | 2/2018 | Belleschi | H04W 72/0446 |
| 2018/0139734 A1* | 5/2018 | Babaei | H04W 72/0406 |
| 2018/0199334 A1* | 7/2018 | Ying | H04W 72/042 |
| 2018/0302886 A1* | 10/2018 | Pan | H04W 72/0413 |
| 2019/0132092 A1* | 5/2019 | Chen | H04L 5/0055 |
| 2019/0222349 A1* | 7/2019 | Gao | H04W 72/1205 |
| 2020/0053756 A1* | 2/2020 | Sun | H04W 72/042 |
| 2020/0100252 A1* | 3/2020 | Li | H04W 72/04 |
| 2020/0100263 A1* | 3/2020 | Gupta | H04W 72/121 |
| 2020/0252909 A1* | 8/2020 | Yu | H04W 72/042 |
| 2022/0046665 A1* | 2/2022 | Takeda | H04W 72/0466 |

\* cited by examiner

ENHANCEMENTS TO SUPPORT MULTIPLE SEMI-PERSISTENT RESOURCE ALLOCATIONS PER SERVING CELL

CROSS-REFERENCE TO RELATED APPLICATION(S)

This application claims benefit of and priority to U.S. Provisional Patent Application Ser. No. 62/796,280, filed Jan. 24, 2019, herein incorporated by reference in its entirety as if fully set forth below and for all applicable purposes.

INTRODUCTION

Field of the Disclosure

Aspects of the present disclosure relate to wireless communications, and more particularly, to techniques for supporting multiple semi-persistent resource allocations per serving cell.

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., which may be referred to as a base station, 5G NB, next generation NodeB (gNB or gNodeB), TRP, etc.). A base station or distributed unit may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. New Radio (NR) (e.g., 5G) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communications by a user equipment in a network. The method generally includes determining an association between one or more semi-persistent resource allocations and one or more identifiers; receiving signaling indicating activation or deactivation of at least one of the one or more semi-persistent resource allocations; determining an identifier of the at least one of the one or more semi-persistent resource allocations based on the association; and sending an acknowledgment of the activation or deactivation, wherein the acknowledgment indicates the identifier of the at least one of the one or more semi-persistent resource allocations.

Certain aspects provide a method for wireless communications by a network entity. The method generally includes determining an association between one or more semi-persistent resource allocations and one or more identifiers; sending, to a user equipment (UE), signaling indicating activation or deactivation of at least one of the one or more semi-persistent resource allocations; receiving, from the UE, an acknowledgment with at least one identifier; and confirming that the UE received the signaling indicating the activation or deactivation by determining, based on the association, that the at least one identifier corresponds to the at least one of the one or more semi-persistent resource allocations.

Certain aspects provide a method for wireless communications by a user equipment in a network. The method generally includes determining an association between one or more semi-persistent uplink resource allocations and one or more logical channels; receiving signaling indicating activation of at least one of the one or more semi-persistent uplink resource allocations; and determining a priority of sending traffic on the one or more logical channels using a resource of the at least one of the one or more semi-persistent uplink resource allocations, based on the association and the activation.

Certain aspects provide a method for wireless communications by a network entity. The method generally includes determining an association between one or more semi-persistent uplink resource allocations and one or more logical channels; sending, to a user equipment (UE), signaling indicating the association; and sending, to the UE, signaling indicating activation of at least one of the one or more semi-persistent uplink resource allocations.

Certain aspects provide a method for wireless communications by a user equipment in a network. The method generally includes determining one or more priority rules for resolving conflicts among semi-persistent uplink resource allocations; detecting a conflict between scheduled uplink transmissions on a set of the semi-persistent uplink resource allocations; applying the one or more priority rules to resolve the conflict; and sending traffic based on the applying of the one or more priority rules.

Certain aspects provide a method for wireless communications by a network entity. The method generally includes determining one or more priority rules for resolving conflicts among semi-persistent uplink resource allocations; sending, to the UE, signaling indicating the one or more priority rules; and sending, to a user equipment (UE), signaling indicating activation of the semi-persistent uplink resource allocations.

Certain aspects provide an apparatus comprising one or more processors and a computer readable medium comprising instructions that, when executed by the one or more processors, cause the apparatus to perform a method for wireless communications by a user equipment in a network. The method generally includes determining an association between one or more semi-persistent resource allocations and one or more identifiers; receiving signaling indicating activation or deactivation of at least one of the one or more semi-persistent resource allocations; determining an identifier of the at least one of the one or more semi-persistent resource allocations based on the association; and sending an acknowledgment of the activation or deactivation, wherein the acknowledgment indicates the identifier of the at least one of the one or more semi-persistent resource allocations.

Certain aspects provide an apparatus comprising one or more processors and a computer readable medium comprising instructions that, when executed by the one or more processors, cause the apparatus to perform a method for wireless communications by a network entity. The method generally includes determining an association between one or more semi-persistent resource allocations and one or more identifiers; sending, to a user equipment (UE), signaling indicating activation or deactivation of at least one of the one or more semi-persistent resource allocations; receiving, from the UE, an acknowledgment with at least one identifier; and confirming that the UE received the signaling indicating the activation or deactivation by determining, based on the association, that the at least one identifier corresponds to the at least one of the one or more semi-persistent resource allocations.

Certain aspects provide an apparatus comprising one or more processors and a computer readable medium comprising instructions that, when executed by the one or more processors, cause the apparatus to perform a method for wireless communications by a user equipment in a network. The method generally includes determining an association between one or more semi-persistent uplink resource allocations and one or more logical channels; receiving signaling indicating activation of at least one of the one or more semi-persistent uplink resource allocations; and determining a priority of sending traffic on the one or more logical channels using a resource of the at least one of the one or more semi-persistent uplink resource allocations, based on the association and the activation.

Certain aspects provide an apparatus comprising one or more processors and a computer readable medium comprising instructions that, when executed by the one or more processors, cause the apparatus to perform a method for wireless communications by a network entity. The method generally includes determining an association between one or more semi-persistent uplink resource allocations and one or more logical channels; sending, to a user equipment (UE), signaling indicating the association; and sending, to the UE, signaling indicating activation of at least one of the one or more semi-persistent uplink resource allocations.

Certain aspects provide an apparatus comprising one or more processors and a computer readable medium comprising instructions that, when executed by the one or more processors, cause the apparatus to perform a method for wireless communications by a user equipment in a network. The method generally includes determining one or more priority rules for resolving conflicts among semi-persistent uplink resource allocations; detecting a conflict between scheduled uplink transmissions on a set of the semi-persistent uplink resource allocations; applying the one or more priority rules to resolve the conflict; and sending traffic based on the applying of the one or more priority rules.

Certain aspects provide an apparatus comprising one or more processors and a computer readable medium comprising instructions that, when executed by the one or more processors, cause the apparatus to perform a method for wireless communications by a network entity. The method generally includes determining one or more priority rules for resolving conflicts among semi-persistent uplink resource allocations; sending, to the UE, signaling indicating the one or more priority rules; and sending, to a user equipment (UE), signaling indicating activation of the semi-persistent uplink resource allocations.

Certain aspects provide a non-transitory computer readable medium comprising instructions that, when executed by one or more processors of a computing system, cause the computing system to perform a method for wireless communications by a user equipment in a network. The method generally includes determining an association between one or more semi-persistent resource allocations and one or more identifiers; receiving signaling indicating activation or deactivation of at least one of the one or more semi-persistent resource allocations; determining an identifier of the at least one of the one or more semi-persistent resource allocations based on the association; and sending an acknowledgment of the activation or deactivation, wherein the acknowledgment indicates the identifier of the at least one of the one or more semi-persistent resource allocations.

Certain aspects provide a non-transitory computer readable medium comprising instructions that, when executed by one or more processors of a computing system, cause the computing system to perform a method for wireless communications by a network entity. The method generally includes determining an association between one or more semi-persistent resource allocations and one or more identifiers; sending, to a user equipment (UE), signaling indicating activation or deactivation of at least one of the one or more semi-persistent resource allocations; receiving, from the UE, an acknowledgment with at least one identifier; and confirming that the UE received the signaling indicating the activation or deactivation by determining, based on the association, that the at least one identifier corresponds to the at least one of the one or more semi-persistent resource allocations.

Certain aspects provide a non-transitory computer readable medium comprising instructions that, when executed by one or more processors of a computing system, cause the computing system to perform a method for wireless communications by a user equipment in a network. The method generally includes determining an association between one or more semi-persistent uplink resource allocations and one or more logical channels; receiving signaling indicating activation of at least one of the one or more semi-persistent uplink resource allocations; and determining a priority of sending traffic on the one or more logical channels using a resource of the at least one of the one or more semi-persistent uplink resource allocations, based on the association and the activation.

Certain aspects provide a non-transitory computer readable medium comprising instructions that, when executed by one or more processors of a computing system, cause the computing system to perform a method for wireless communications by a network entity. The method generally includes determining an association between one or more semi-persistent uplink resource allocations and one or more logical channels; sending, to a user equipment (UE), signaling indicating the association; and sending, to the UE, signaling indicating activation of at least one of the one or more semi-persistent uplink resource allocations.

Certain aspects provide a non-transitory computer readable medium comprising instructions that, when executed by one or more processors of a computing system, cause the computing system to perform a method for wireless communications by a user equipment in a network. The method generally includes determining one or more priority rules for resolving conflicts among semi-persistent uplink resource allocations; detecting a conflict between scheduled uplink transmissions on a set of the semi-persistent uplink resource allocations; applying the one or more priority rules to resolve the conflict; and sending traffic based on the applying of the one or more priority rules.

Certain aspects provide a non-transitory computer readable medium comprising instructions that, when executed by one or more processors of a computing system, cause the computing system to perform a method for wireless communications by a network entity. The method generally includes determining one or more priority rules for resolving conflicts among semi-persistent uplink resource allocations; sending, to the UE, signaling indicating the one or more priority rules; and sending, to a user equipment (UE), signaling indicating activation of the semi-persistent uplink resource allocations.

Certain aspects provide an apparatus for wireless communications by a user equipment in a network. The apparatus generally includes means for determining an association between one or more semi-persistent resource allocations and one or more identifiers; means for receiving signaling indicating activation or deactivation of at least one of the one or more semi-persistent resource allocations; means for determining an identifier of the at least one of the one or more semi-persistent resource allocations based on the association; and means for sending an acknowledgment of the activation or deactivation, wherein the acknowledgment indicates the identifier of the at least one of the one or more semi-persistent resource allocations.

Certain aspects provide an apparatus for wireless communications by a network entity. The apparatus generally includes means for determining an association between one or more semi-persistent resource allocations and one or more identifiers; means for sending, to a user equipment (UE), signaling indicating activation or deactivation of at least one of the one or more semi-persistent resource allocations; means for receiving, from the UE, an acknowledgment with at least one identifier; and means for confirming that the UE received the signaling indicating the activation or deactivation by determining, based on the association, that the at least one identifier corresponds to the at least one of the one or more semi-persistent resource allocations.

Certain aspects provide an apparatus for wireless communications by a user equipment in a network. The apparatus generally includes means for determining an association between one or more semi-persistent uplink resource allocations and one or more logical channels; means for receiving signaling indicating activation of at least one of the one or more semi-persistent uplink resource allocations; and means for determining a priority of sending traffic on the one or more logical channels using a resource of the at least one of the one or more semi-persistent uplink resource allocations, based on the association and the activation.

Certain aspects provide an apparatus for wireless communications by a network entity. The method generally includes means for determining an association between one or more semi-persistent uplink resource allocations and one or more logical channels; means for sending, to a user equipment (UE), signaling indicating the association; and means for sending, to the UE, signaling indicating activation of at least one of the one or more semi-persistent uplink resource allocations.

Certain aspects provide an apparatus for wireless communications by a user equipment in a network. The apparatus generally includes means for determining one or more priority rules for resolving conflicts among semi-persistent uplink resource allocations; means for detecting a conflict between scheduled uplink transmissions on a set of the semi-persistent uplink resource allocations; means for applying the one or more priority rules to resolve the conflict; and means for sending traffic based on the applying of the one or more priority rules.

Certain aspects provide an apparatus for wireless communications by a network entity. The apparatus generally includes means for determining one or more priority rules for resolving conflicts among semi-persistent uplink resource allocations; means for sending, to the UE, signaling indicating the one or more priority rules; and means for sending, to a user equipment (UE), signaling indicating activation of the semi-persistent uplink resource allocations.

Certain aspects of the present disclosure also provide various apparatus, means, and computer readable medium configured to perform (or cause a processor to perform) the operations described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this dis

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
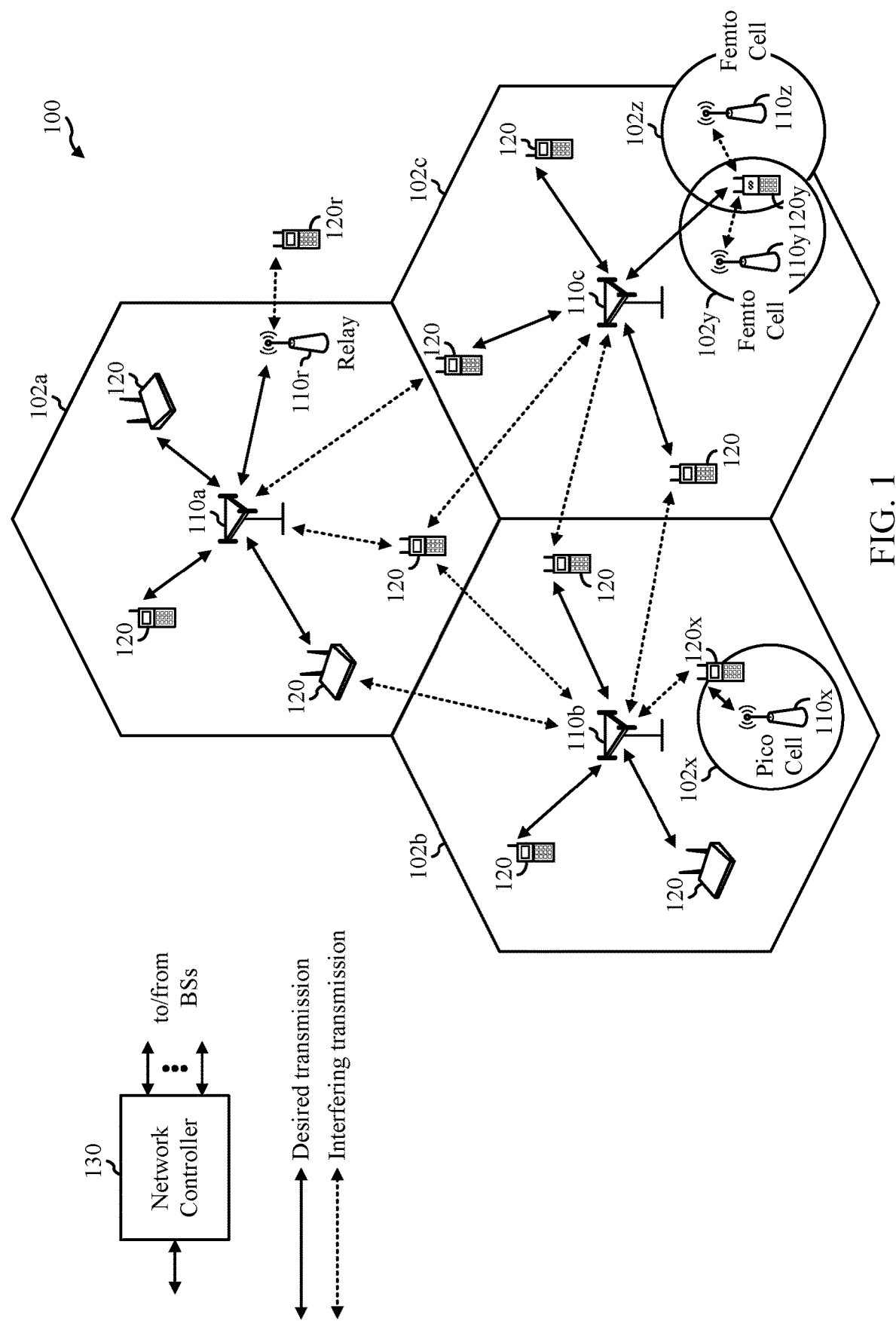
- FIG. 1 is a block diagram conceptually illustrating an example telecommunications system, in accordance with certain aspects of the present disclosure.

Aspects of the present disclosure relate to wireless communications, and more particularly, to techniques for supporting multiple semi-persistent resource allocations per serving cell.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA.

UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, UEs 120 and network entities (such as BSs 110) may be configured to handle collisions between SRS and PUSCH transmissions using techniques described herein with reference to FIGS. 9 and 10, respectively.

As illustrated in FIG. 1, the wireless network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a Node B subsystem serving this coverage area, depending on the context in which the term is used. In NR systems, the term "cell" and next generation NodeB (gNB), new radio base station (NR BS), 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A base station (BS) may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled, wherein a scheduling entity (e.g., abase station) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
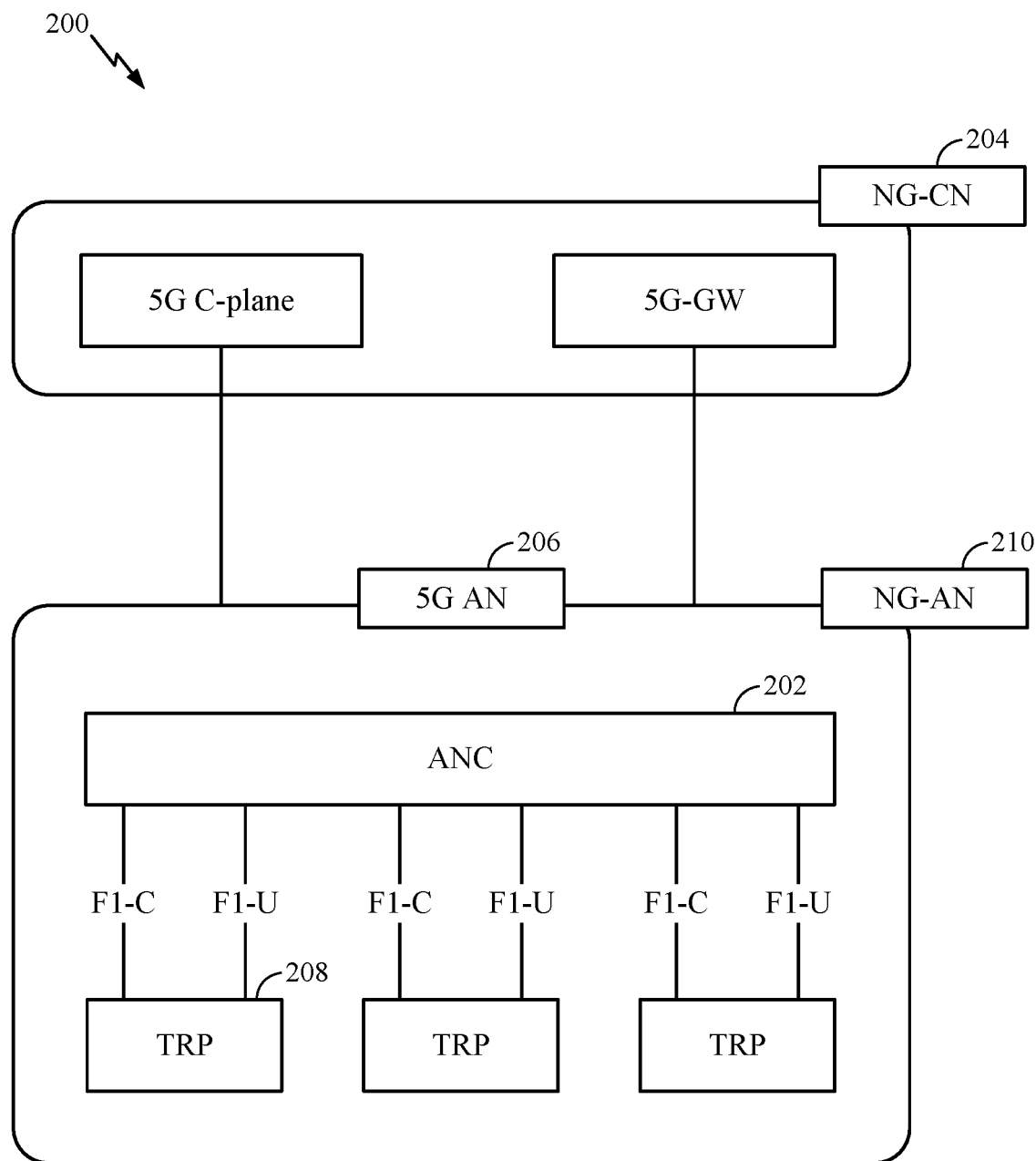
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more transmission reception points (TRPs) 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
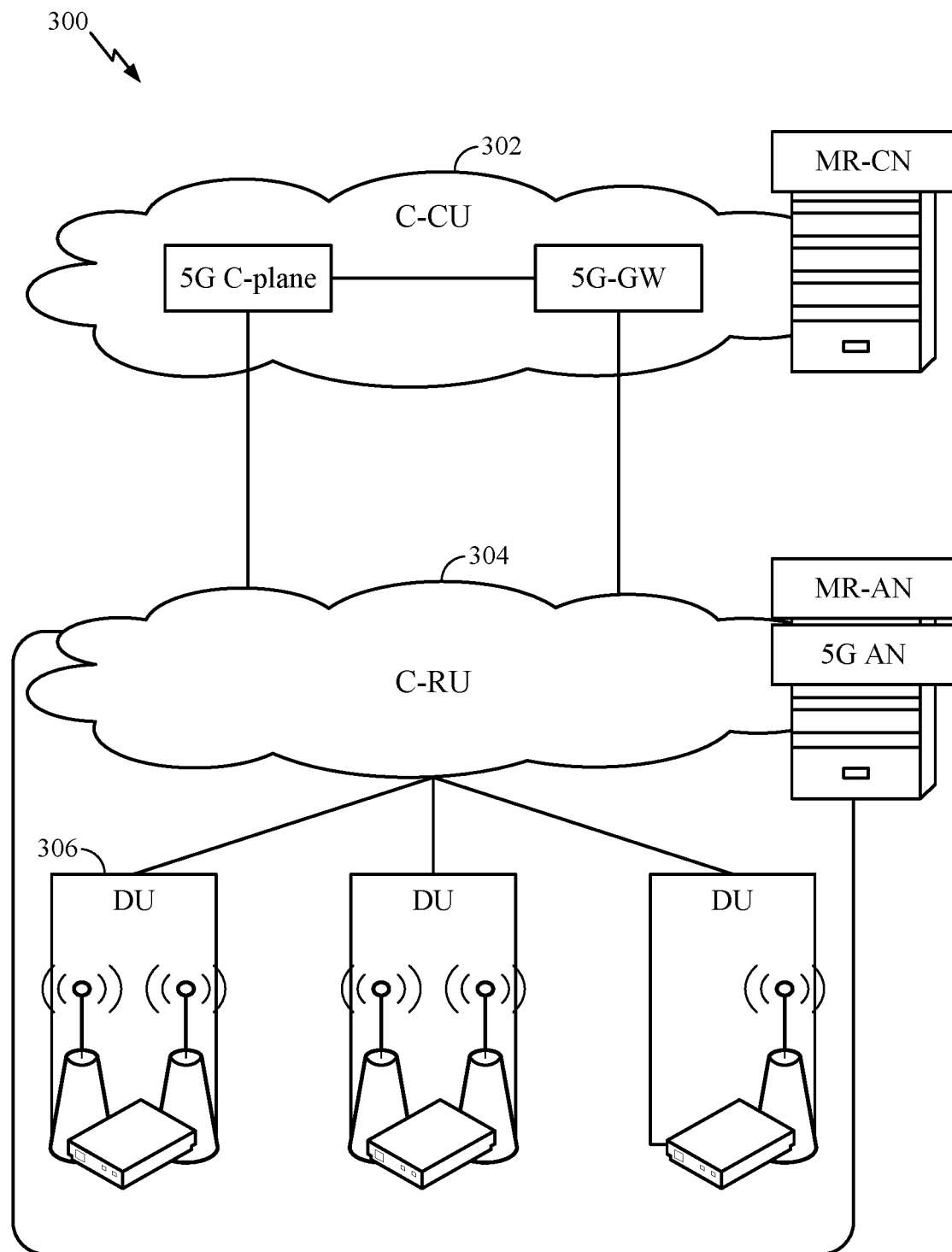
FIG. 3 is a diagram illustrating an example physical architecture of a distributed RAN, in accordance with certain aspects of the present disclosure.

FIG. 3 illustrates an example physical architecture of a distributed Radio Access Network (RAN) 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
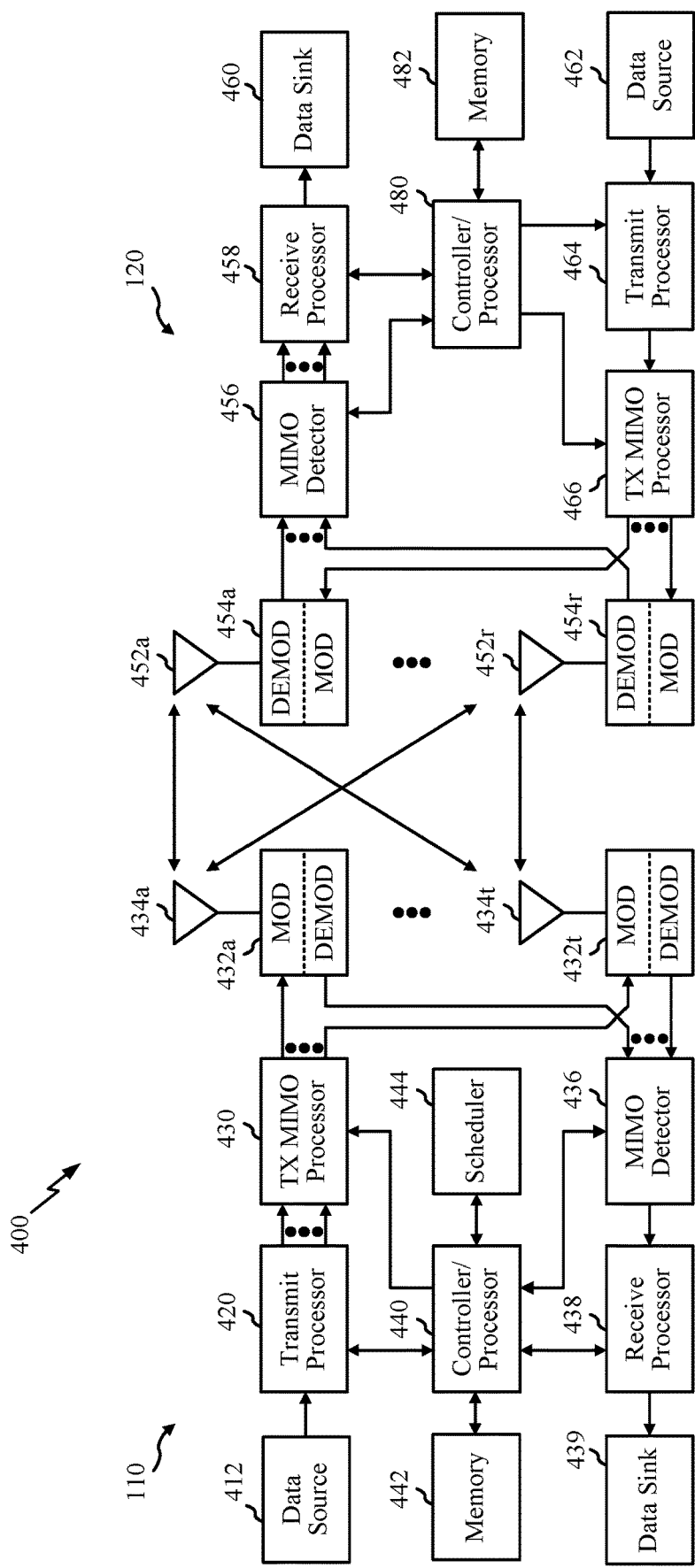
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 and/or antennas 434, processors 420, 430, 438, and/or controller/processor 440 of the BS 110 may be used to perform the various techniques and methods described herein.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DE-MODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the BS 110 may perform or direct the execution of processes for the techniques described herein. The processor 480 and/or other processors and modules at the UE 120 may perform or direct the execution of processes for the techniques described herein. The memories 442 and 482 may store data and program codes for BS 110 and UE 120, respectively. A scheduler 444 may schedule UEs for data transmission on the downlink and/or uplink.

Figure 5:
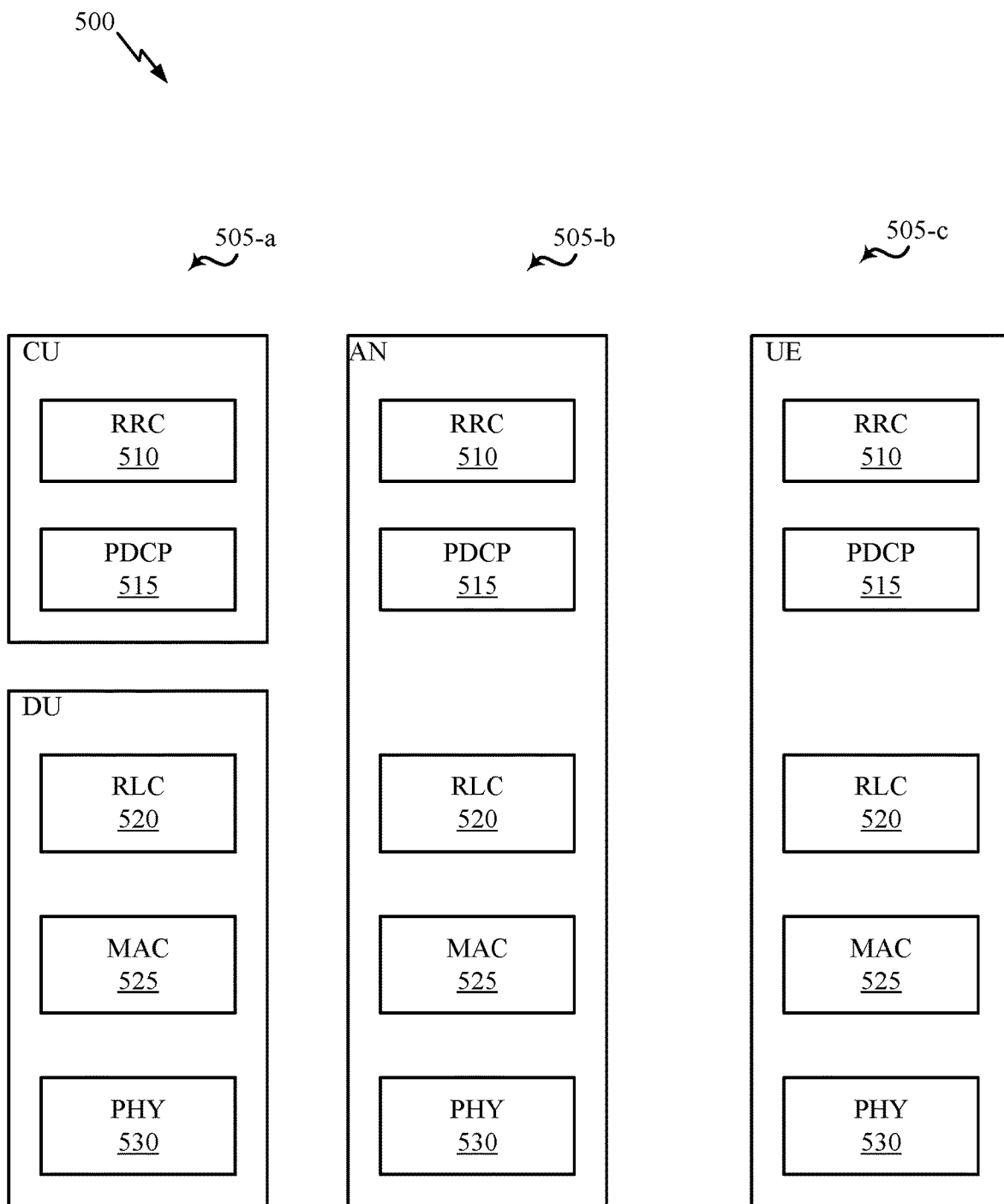
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., a DU such as TRP DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-b may be useful in, for example, a femto cell deployment.

Regardless of whether a network access device implements part or all of a protocol stack, a UE may implement an entire protocol stack as shown in 505-c (e.g., the RRC layer 510, the PDCP layer 515, the RLC layer 520, the MAC layer 525, and the PHY layer 530).

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
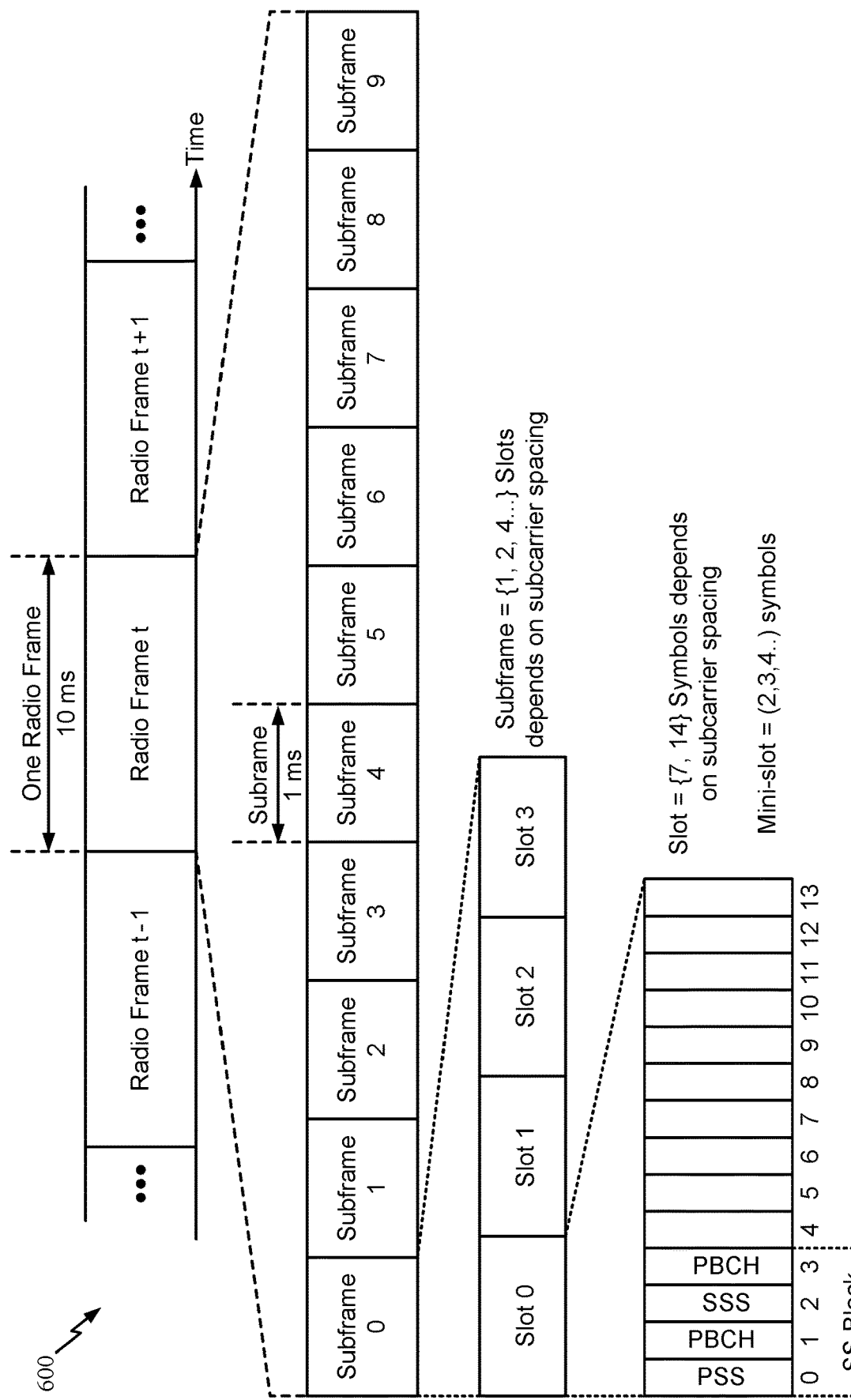
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched.

The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block may be transmitted up to sixty-four times, for example, with up to sixty-four different beam directions for mmW. The up to sixty-four transmissions of the SS block are referred to as the SS burst set.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Enhancements to Support Multiple Semi Persistent Resource Allocations Per Serving Cell A semi-persistent resource allocation may refer to semi-persistent scheduling (SPS) or a configured grant (CG). Semi-persistent scheduling (SPS), which is sometimes called configured downlink assignment, refers to a scheduling technique where a user-equipment (UE) is pre-configured by the network/base station (e.g., eNBs, gNB, etc.) with a periodicity and an offset. Once pre-configured, if the UE were to receive an allocation of downlink resources, then the allocation would repeat according to the pre-configured periodicity. A configured grant (CG) is similar to SPS, except for uplink resources rather than downlink resources. A UE may be pre-configured by the base station with an uplink periodicity and period for CGs. Once pre-configured, if the UE were to receive an allocation of an uplink resource (e.g., a CG), then the allocation would repeat according to the pre-configured uplink periodicity and offset.

For SPS, the base station may use Radio Resource Control (RRC) signaling to define the periodicity of configured downlink assignments. In some cases, the base station uses a physical downlink control channel (PDCCH) with downlink control information (DCI) addressed to the configured scheduling radio network temporary identifier (CS-RNTI) of the UE to activate or deactivate a downlink assignment for the UE, and to indicate an offset for SPS. Post-activation, a downlink assignment can be implicitly reused according to the periodicity defined by RRC without requiring additional signaling (e.g., DCI) until the assignment is deactivated. Typically, one SPS is configured using RRC per serving cell and per bandwidth part (BWP), and multiple SPS configurations can conventionally only be simultaneously active on different serving cells. Activation and deactivation of SPS is typically independent among different serving cells.

For a CG, the base station may use RRC signaling to directly provide a configured uplink grant, including a defined periodicity, to a UE (this may be called type 1). In other embodiments, the base station uses RRC to define the periodicity of a configured uplink grant and uses a PDCCH with DCI addressed to the CS-RNTI of the base station to activate or deactivate the grant (this may be called type 2). Post-activation, an uplink grant can be implicitly reused according to the periodicity defined by RRC without requiring additional signaling (e.g., DCI) until the grant is deactivated. Similarly to SPS, a CG (e.g., either type 1 or type 2) is typically configured per serving cell and per bandwidth part (BWP) and multiple CG configurations can conventionally only be simultaneously active on different serving cells. For a type 2 CG, activation and deactivation is typically independent among different serving cells. For the same serving cell, the medium access control (MAC) entity is configured with either type 1 or type 2.

SPSs and CGs provide a variety of benefits, such as reducing PDCCH overhead and avoiding failures due to missed PDCCH signaling. While existing techniques generally allow only one SPS or CG per serving cell for a UE, there may be cases where it would be beneficial to allow multiple SPSs or CGs per serving cell for a UE. For example, a single UE may run applications with multiple traffic sources. As discussed below with respect to FIG. 7, multiple devices may communicate with a programmable logical controller (PLC) via a single UE, and each device may have different traffic patterns (e.g., period, offset, and the like). As such, there is a need in the art for techniques that allow for multiple semi-persistent resource allocations per serving cell. With multiple semi-persistent resource allocations per serving cell, each of them may need to be associated with an identifier. Identifiers associated with a semi-persistent resource allocation of a UE may be unique within a serving cell of the UE or may be unique with a group of cells serving the UE.

Figure 7:
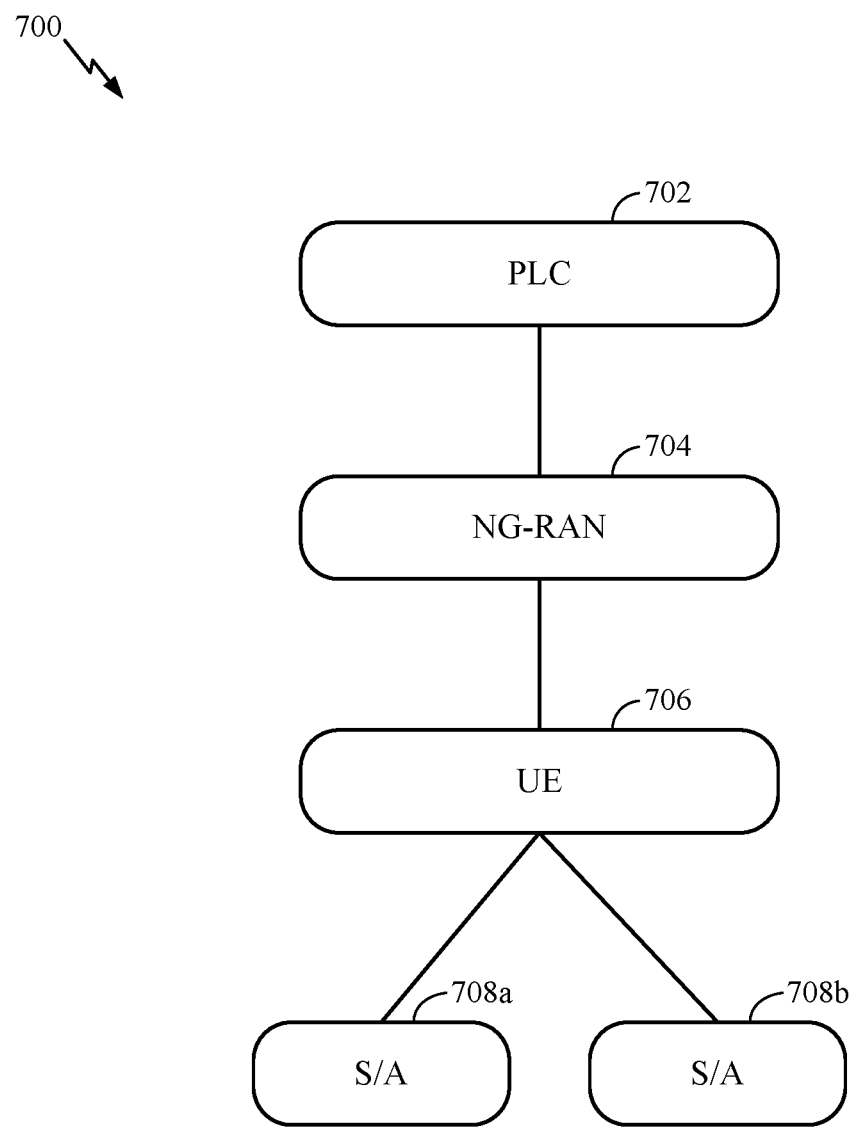
FIG. 7 illustrates an example networking environment in which embodiments of the present disclosure may be implemented.

FIG. 7 illustrates an example networking environment 700 in which embodiments of the present disclosure may be implemented.

In networking environment 700, sensors/actuators (S/A) 708a and 708b communicate with a programmable logic controller (PLC) 702 via a UE 706 and a next generation radio access node (NG-RAN) 704. Examples of S/A include rotary motor devices, linear servo, and position sensors. S/A 708a and 708b are controlled by PLC 702. PLC 702 includes custom hardware which issue a series of commands and receives sensor input in real time. As an example, PLC 702 issues a motion command and receives position inputs in real-time from S/A 708a and/or 708b. NG-RAN 704 may support dual connectivity with NR, may support carrier aggregation and may share a common fronthaul for LTE and NR. While not shown, NG-RAN 704 may communicate with PLC 702 via an adapter, and UE 706 may communicate with S/A 708a and S/A 708b via an adapter.

Techniques described herein allow for multiple semi-persistent resource allocations (e.g., SPS and/or CG) per serving cell for a UE. For example, traffic associated with S/A 708a and S/A 708b may each be granted a separate SPS or CG by the base station, and each may use its own separate SPS or CG to communicate with PLC 702.

In one embodiment, a base station, such as a BS 110 of FIG. 1 associates each SPS and/or CG with an identifier, such a numerical or textual identifier or index that uniquely identifies the SPS and/or CG. The base station may then communicate the association between each SPS and/or CG to a UE, such as UE 706 or a UE 120 of FIG. 1. The base station then indicates activation or deactivation of an SPS or CG through signaling to the UE (e.g., via RRC, MAC CE, and/or using PDCCH signaling with DCI), and the UE confirms receipt of the activation or deactivation by sending a confirmation to the base station including the identifier of the SPS or CG (e.g., which the UE determines based on the association). The confirmation may, for instance, be sent via a medium access control (MAC) control element (CE). An identifier of an SPS or CG may be either cell group wide or cell specific. In cases where multiple SPSs or CGs have been activated or deactivated, the UE may either send the identifiers of the multiple SPSs or CGs in a single MAC CE or via a bitmap where each bit in the bitmap is associated with an SPS or CG. The bit associated with a given SPS or CG in the bitmap may be determined based on the identifier of the given SPS or CG.

In some embodiments, the base station may activate or deactivate a plurality of SPS or CG jointly, such as using a single instance of DCI signaling. Indication of activation or deactivation may be achieved in a variety of ways, such as including the identifier of each SPS or CG that is being activated or deactivated in one instance of DCI signaling or including a bitmap in DCI where each bit in the bitmap is associated with an SPS or CG. The bit associated with a given SPS or CG in the bitmap may be determined based on the identifier of the given SPS or CG and/or additional signaling (e.g., RRC signaling). Alternatively, a group identifier may be associated with a set of SPSs or CGs, and the group identifier may be used to signal activation or deactivation of each of the set of SPSs or CGs. For activation, the DCI may additionally include SPS/CG-specific configuration information, such as a modulation coding scheme (MCS), for each activated SPS or CG.

For CGs, some embodiments may involve associating a CG or set of CGs with a logical channel, and the logical channel's traffic may only be communicated using the CG or set of CGs. For example, once associated, no grants other than the CG or set of CGs may be used to communicate traffic for the logical channel. Logical channel prioritization (LCP) may then be used by a UE to determine how resources associated with a given uplink transmission are allocated among logical channels. Based on the association, the logical channel's traffic will be prioritized when communicated using the CG or set of CGs associated with the logical channel. An association between a logical channel and one or more CGs may be signaled to a UE (e.g., RRC or MAC CE signaling), such as including identifier(s) of the one or more CGs. In some embodiments, the CG identifier(s) may be included as an information element (IE) in LogicalChannelConfig.ul-SpecificParameters as defined in 3GPP. As such, enhanced LCP restrictions may be implemented for a plurality of CGs.

Scheduled resources for multiple CGs associated with the same serving cell can overlap or conflict in time. As such, priority rules may be defined for resolving conflicts between scheduled uplink transmissions. For example, if two CGs have an overlapping transmissions occasion, the CG with the highest priority may be selected. In some embodiments, the non-selected CG is not used and is not considered a candidate CG for future conflict resolutions (e.g., between the non-selected CG and other CGs). Priority of a CG may be determined in a number of different ways. In one example, the network configures priorities of CGs through signaling, such as RRC signaling, that indicates a priority level for each CG. In alternative embodiments, the priority of a CG is determined to be the highest priority of a logical channel eligible for the CG based on LCP restrictions (e.g., where logical channels are associated with CGs). In some embodiments, only logical channels with data may be considered in determining priority. For example, if three logical channels are eligible to use a given CG and the priorities of the three logical channels are 2, 4, and 6 respectively, then the priority of the given CG may be determined to be 6.

If two CGs in conflict are determined to have the same priority, the UE may use their identifiers to break the tie, such as by selecting the CG with a higher index as its identifier.

If multiple pairs of CGs have conflicts, an order for resolving the conflicts may be determined based on the priorities of the CGs in the pairs. For example, the pair that includes the highest priority CG may be selected for resolving first, and subsequent pairs may similarly be resolved in an order based on priorities of CGs in the pairs.

Resolving conflicts among scheduled transmissions using CGs is described in more detail below with respect to FIG. 14.

Figure 8:
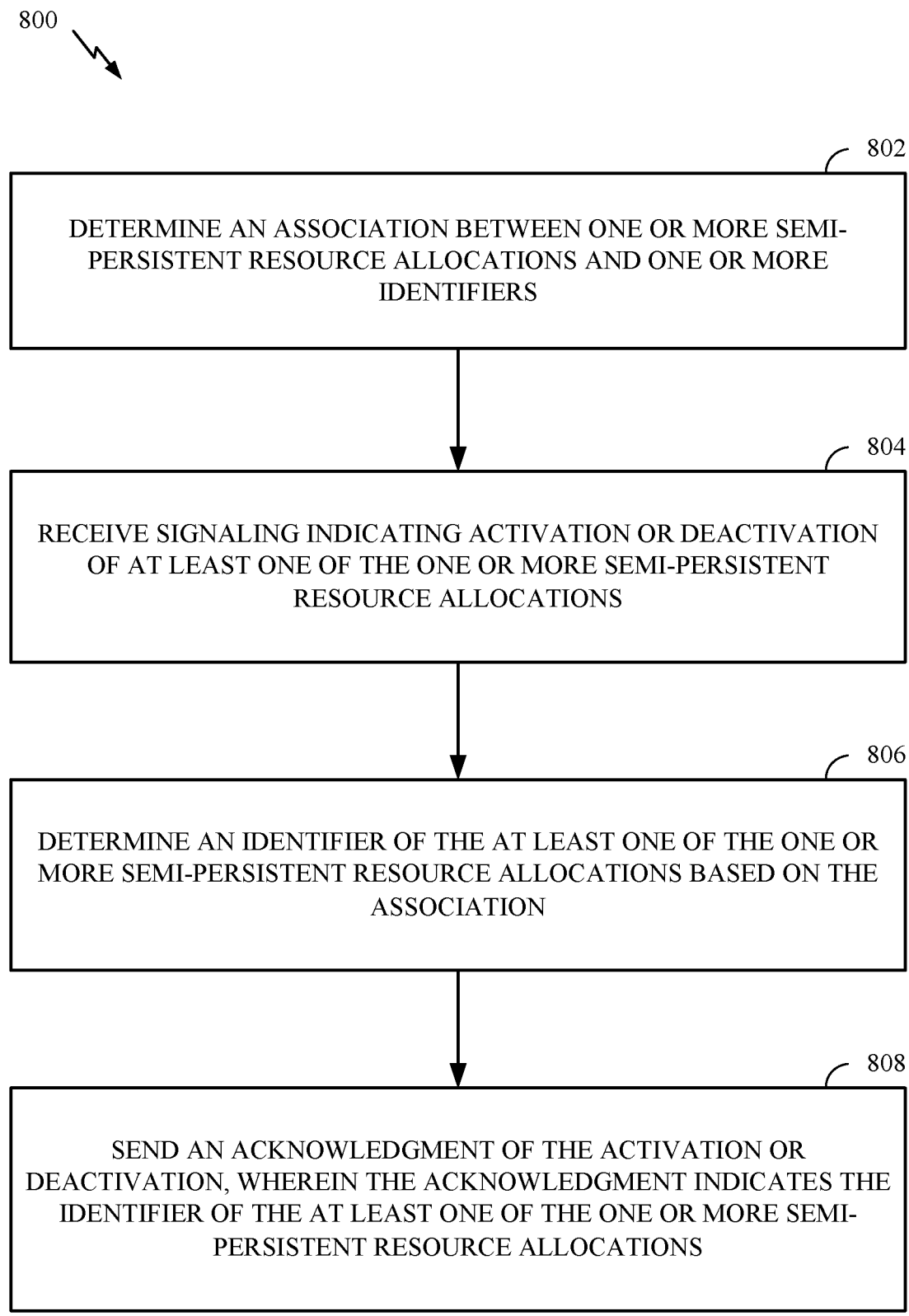
FIG. 8 illustrates example operations for wireless communications by a user equipment, in accordance with certain aspects of the present disclosure.

Example Operations Related to Supporting Multiple Semi-Persistent Resource Allocations Per Serving Cell FIG. 8 depicts example operations 800 for wireless communications by a user equipment (UE), in accordance with certain aspects of the present disclosure. For example, operations 800 may be performed by UE 706 of FIG. 7 or a UE 120 of FIG. 1.

At 802, an association is determined between one or more semi-persistent resource allocations and one or more identifiers. For example, the UE may receive signaling, such as RRC signaling from a base station, indicating the association. A semi-persistent resource allocation may be either an SPS or a CG.

At 804, signaling indicating activation or deactivation of at least one of the one or more semi-persistent resource allocations is received. For example, the UE may receive PDCCH signaling with DCI indicating the activation or deactivation. In some embodiments, the signaling includes an identifier of at least one of the one or more the semi-persistent resource allocations.

At 806, an identifier of the at least one of the one or more semi-persistent resource allocations is determined based on the association. For example, the UE may determine that the identifier is associated with the at least one of the one or more semi-persistent resource allocations based on the association determined at 802.

At 808, an acknowledgment of the activation or deactivation is sent, wherein the acknowledgment indicates the identifier of the at least one of the one or more semi-persistent resource allocations. For example, the UE may send the acknowledgment via a MAC CE. The acknowledgment may include the identifier determined at 806. If a plurality of semi-persistent resource allocations is activated at step 804, the acknowledgment may include identifiers associated with each of the plurality of semi-persistent resource allocations or a group identifier associated with the plurality of semi-persistent resource allocations. In some embodiments, the acknowledgment includes a bitmap where each bit in the bitmap is associated with a semi-persistent resource allocation. The bit associated with a given semi-persistent resource allocation in the bitmap may be determined based on the identifier of the given semi-persistent resource allocation. It is noted that identifiers for semi-persistent resource allocations may be either cell group wide identifiers or cell specific identifiers.

Figure 9:
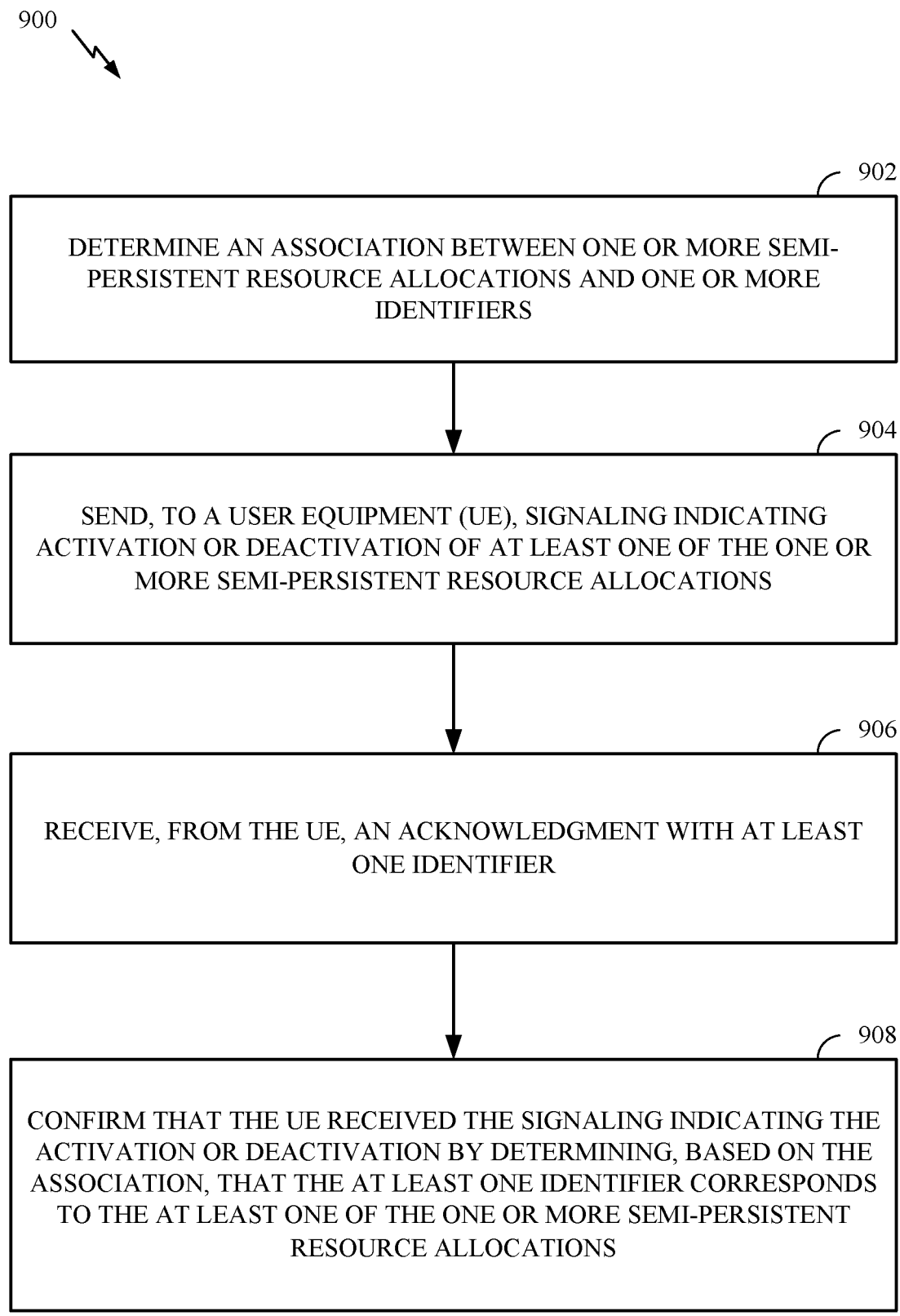
FIG. 9 illustrates example operations for wireless communications by a network entity, in accordance with certain aspects of the present disclosure.

FIG. 9 depicts example operations 900 for wireless communications by a network entity, in accordance with certain aspects of the present disclosure. For example, operations 900 may be performed by a base station, such as a BS 110 of FIG. 1.

At 902, an association is determined between one or more semi-persistent resource allocations and one or more identifiers. For example, the base station may determine one or more identifiers for the one or more semi-persistent resource allocations and associate the identifiers with the semi-persistent resource allocations. A semi-persistent resource allocation may be either an SPS or a CG.

At 904, signaling indicating activation or deactivation of at least one of the one or more semi-persistent resource allocations is sent to a UE. For example, the base station may send PDCCH signaling with DCI to the UE indicating the activation or deactivation. In some embodiments, the signaling includes an identifier of the one or more identifiers that is associated with the at least one of the one or more semi-persistent resource allocations.

At 906, an acknowledgment is received from the UE with at least one identifier. For example, the base station may receive the acknowledgment via a MAC CE from the UE in response to the signaling sent at 904, and the acknowledgment may include the at least one identifier, which may be associated with the at least one of the one or more semi-persistent resource allocations.

At 908, it is confirmed that the UE received the signaling indicating the activation or deactivation by determining, based on the association, that the at least one identifier corresponds to the at least one of the one or more semi-persistent resource allocations. For example, the base station may use the association determined at 902 to determine that the at least one identifier received at 906 corresponds to (e.g., is associated with) the at least one of the one or more semi-persistent resource allocations. As such, the base station may determine that the acknowledgment received at 906 corresponds to the at least one of the one or more semi-persistent resource allocations, which the base station activated or deactivated at 904. If a plurality of semi-persistent resource allocations is activated at step 904, the acknowledgment may include identifiers associated with each of the plurality of semi-persistent resource allocations or a group identifier associated with the plurality of semi-persistent resource allocations. In some embodiments, the acknowledgment includes a bitmap where each bit in the bitmap is associated with a semi-persistent resource allocation. The bit associated with a given semi-persistent resource allocation in the bitmap may be determined based on the identifier of the given semi-persistent resource allocation. It is noted that identifiers for semi-persistent resource allocations may be either cell group wide identifiers or cell specific identifiers.

Figure 10:
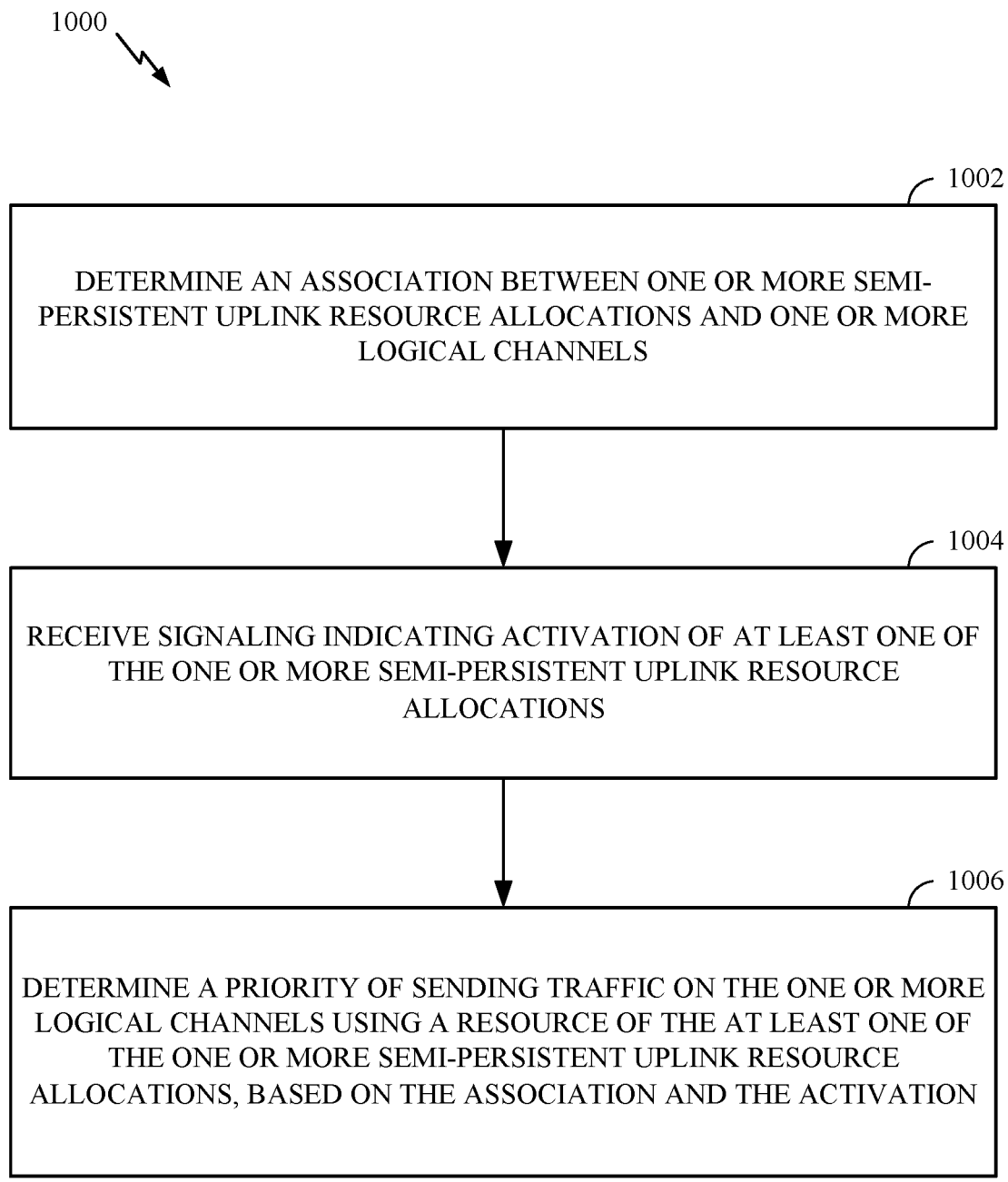
FIG. 10 illustrates example operations for wireless communications by a user equipment, in accordance with certain aspects of the present disclosure.

FIG. 10 depicts example operations 1000 for wireless communications by a user equipment (UE), in accordance with certain aspects of the present disclosure. For example, operations 1000 may be performed by UE 706 of FIG. 7 or a UE 120 of FIG. 1.

At 1002, an association is determined between one or more semi-persistent uplink resource allocations and one or more logical channels. For example, the UE may receive signaling, such as RRC signaling from a base station, indicating the association. A semi-persistent uplink resource allocation may, for example, be a CG.

At 1004, signaling indicating activation or deactivation of at least one of the one or more semi-persistent uplink resource allocations is received. For example, the UE may receive PDCCH signaling with DCI indicating the activation or deactivation. In some embodiments, the signaling includes one or more identifiers of the at least one of the one or more semi-persistent uplink resource allocations. For example, the signaling may include an identifier of each of the at least one of the one or more semi-persistent uplink resource allocations or a group identifier associated with all of the at least one of the one or more semi-persistent uplink resource allocations (e.g., in the case where more than one semi-persistent uplink resource allocation is activated or deactivated). The one or more identifiers may be included in the signaling or the signaling may include a bitmap where each bit in the bitmap is associated with a semi-persistent resource allocation. The bit associated with a given semi-persistent resource allocation in the bitmap may be determined based on the identifier of the given semi-persistent resource allocation. In some embodiments, the UE determines one or more identifiers of the activated or deactivated semi-persistent uplink resource allocation(s) and includes the one or more identifiers in an acknowledgement of the activation or deactivation sent to the base station, such as via a MAC CE.

At 1006, a priority of sending traffic on the one or more logical channels using a resource of the at least one of the one or more semi-persistent uplink resource allocations is determined. For example, the UE may prioritize the traffic for the one or more logical channels associated with the activated at least one of the one or more semi-persistent uplink resource allocations when sending traffic on the one or more logical channels using the resource of the at least one of one or more semi-persistent uplink resource allocations. A resource may, for example, be a collection of RBs, a collection of symbols in a slot or mini-slot, or the like. The determined priority may call for communicating traffic for a given logical channel only using semi-persistent uplink resource allocations that are associated with the given logical channel.

Figure 11:
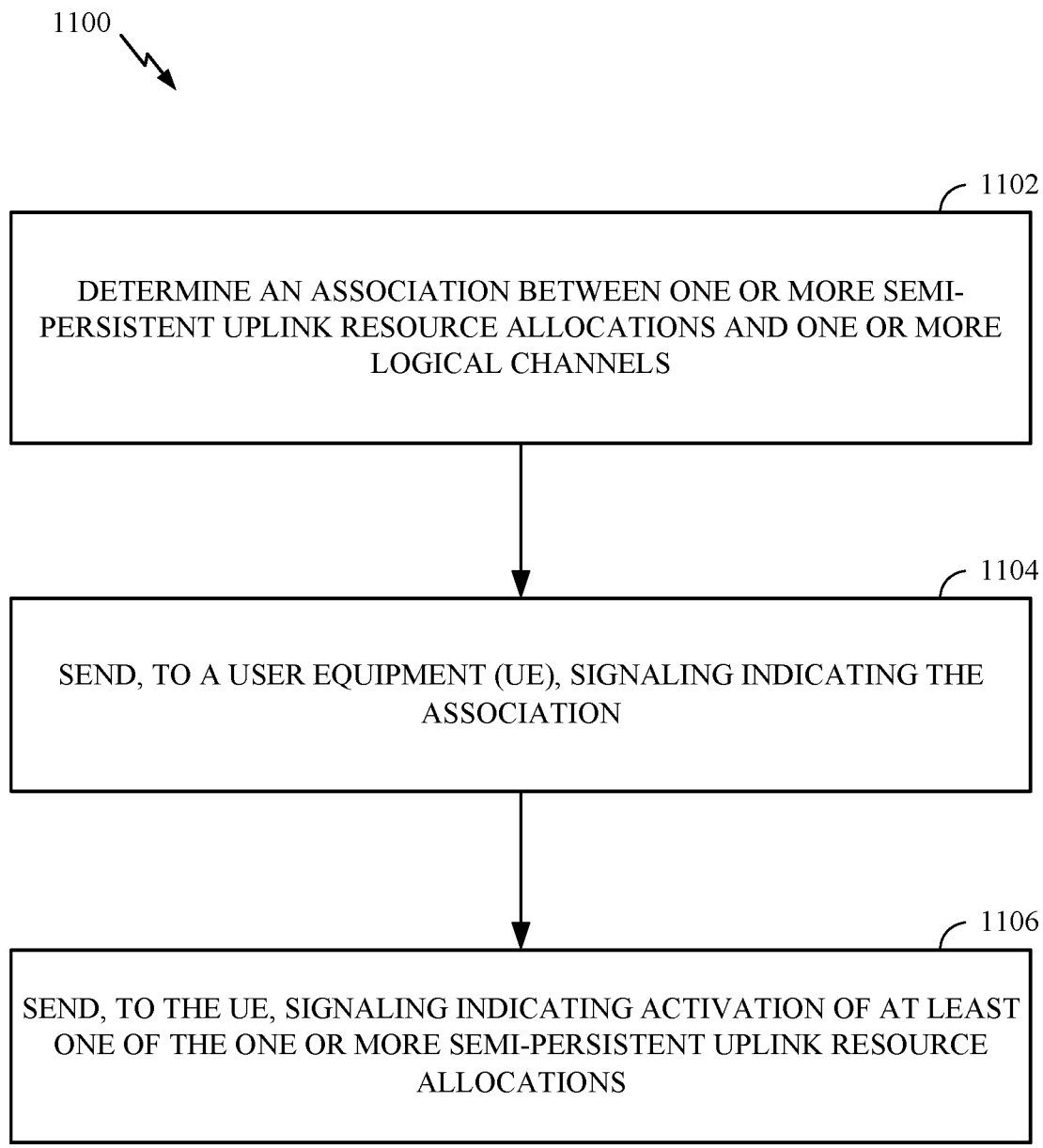
FIG. 11 illustrates example operations for wireless communications by a network entity, in accordance with certain aspects of the present disclosure.

FIG. 11 depicts example operations 1100 for wireless communications by a network entity, in accordance with certain aspects of the present disclosure. For example, operations 1100 may be performed by a base station, such as a BS 110 of FIG. 1.

At 1102, an association is determined between one or more semi-persistent uplink resource allocations and one or more logical channels. For example, the base station associated the one or more semi-persistent uplink resources with the one or more logical channels. A semi-persistent uplink resource allocation may, for example, be a CG.

At 1104, signaling indicating the association is sent to a UE. For example, the base station may send RRC signaling to the UE indicating the association.

At 1106, signaling indicating activation or deactivation of at least one of the one or more semi-persistent uplink resource allocations is sent to a UE. For example, the base station may send PDCCH signaling with DCI to the UE indicating the activation or deactivation. In some embodiments, the signaling includes one or more identifiers associated with the at least one of the one or more semi-persistent uplink resource allocations. In certain embodiments, the UE responds with an acknowledgment, such as via a MAC CE, that includes the one or more identifiers.

Figure 12:
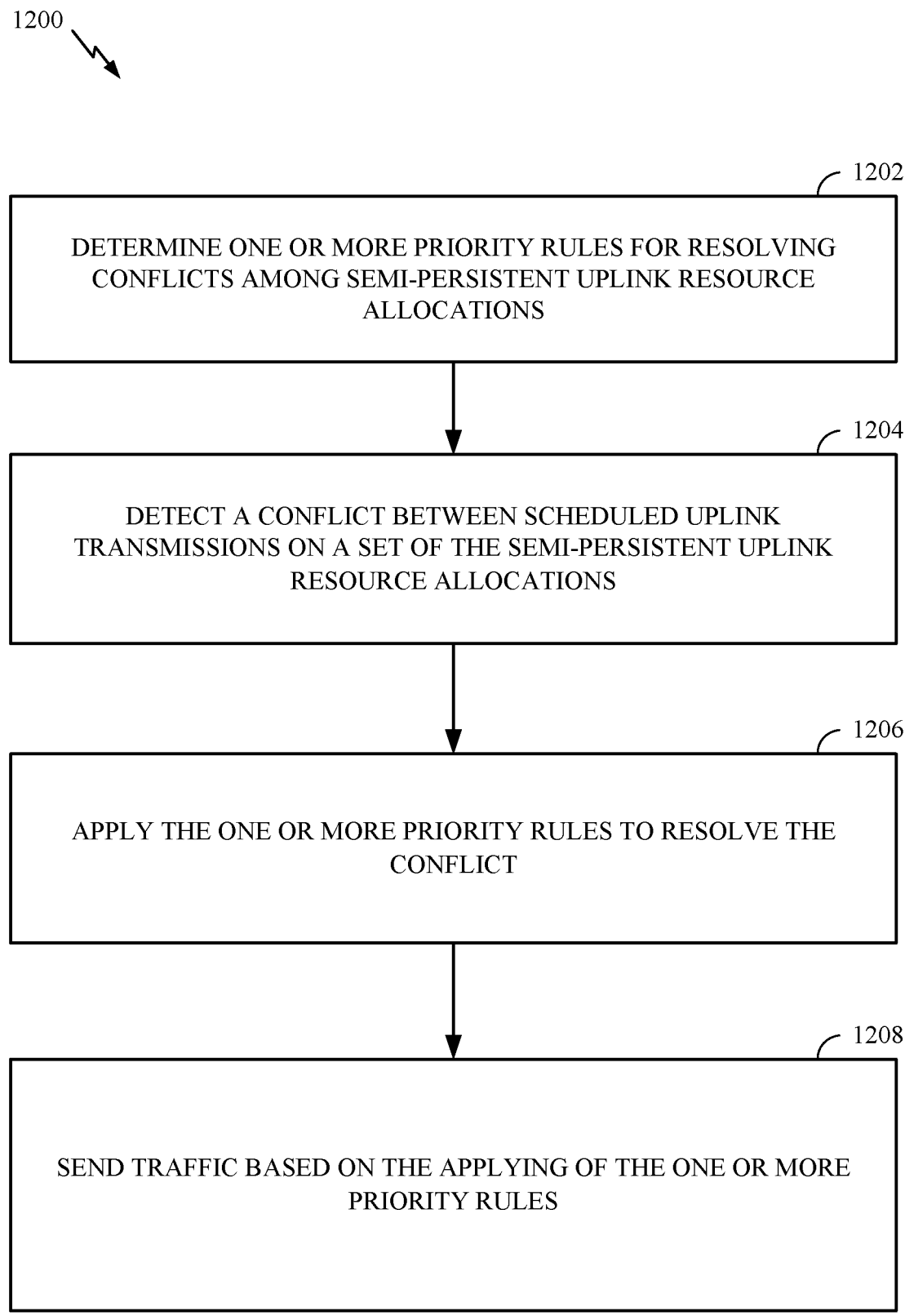
FIG. 12 illustrates example operations for wireless communications by a user equipment, in accordance with certain aspects of the present disclosure.

FIG. 12 depicts example operations 1200 for wireless communications by a user equipment (UE), in accordance with certain aspects of the present disclosure. For example, operations 1200 may be performed by UE 706 of FIG. 7 or a UE 120 of FIG. 1. Different types of traffic may have different periodicities that result in the conflicts resolved in operations 1200. Certain types of traffic may be more "urgent" or higher priority traffic with higher periodicities, such as commands and input received in real-time (e.g., as described with respect to communication between S/A 708a/708b and PLC 702 of FIG. 7). Conversely, some types of traffic may be less urgent or lower priority traffic with lower periodicities, such as general health, heartbeat, and diagnostic traffic that is not sent/received in real-time. As such, priority rules may be defined for resolving conflicts among scheduled transmissions on semi-persistent uplink resource allocations that may have varying periodicities.

At 1202, one or more priority rules for resolving conflicts among semi-persistent uplink resource allocations are determined. For example, the UE may receive signaling, such as RRC signaling from a base station, indicating the one or more priority rules. A semi-persistent uplink resource allocation may be a CG. A priority rule may, for example, define a rule for resolving conflicts among semi-persistent uplink resource allocations.

At 1204, a conflict between scheduled uplink transmissions on a set of the semi-persistent uplink resource allocations is detected. For example, the UE may determine that the scheduled uplink transmissions overlap in time (e.g., either completely or in part).

At 1206, the one or more priority rules are applied to resolve the conflict. For example, a priority rule may state that if a pair of scheduled uplink transmissions on a pair of semi-persistent uplink resource allocations are in conflict, the semi-persistent uplink resource allocation with the highest priority of the pair is selected. The scheduled transmission on the selected semi-persistent uplink resource allocation of the pair may be performed and the scheduled transmission on the unselected semi-persistent uplink resource allocation may not be performed. In some embodiments, a priority rule may state that if multiple pairs of scheduled transmissions on multiple pairs of semi-persistent uplink resource allocations are in conflict, then the pairs must be resolved in a particular order. For instance, the pair that has the semi-persistent uplink resource allocation with the highest priority may be resolved first, then the pair that has the semi-persistent uplink resource allocation with the second highest priority may be resolved next, and so on. Once a pair has been resolved by selecting one semi-persistent uplink resource allocation, the unselected semi-persistent uplink resource allocation may be discarded from future pairs. As such, techniques described herein may allow for selecting the maximum possible number of scheduled transmissions from a set in conflict.

A priority rule may state that if priorities of a pair of semi-persistent uplink resource allocations are equal, then the identifiers of the pair of semi-persistent uplink resource allocations are to be used to break the tie. For example, if the identifiers are numerical (e.g., indices) the semi-persistent uplink resource allocation with the highest identifier may be selected to break the tie.

Applying the one or more priority rules may, therefore, involve determining priorities of each of the set of semi-persistent uplink resource allocations and resolving conflicts based on the priorities. Determining the priority of a given semi-persistent uplink resource allocation may comprise receiving signaling indicating the priority. In some embodiments, determining the priority of a given semi-persistent uplink resource allocation comprises determining priorities of one or more logical channels associated with the given semi-persistent uplink resource allocation and selecting the highest priority of the one or more logical channels as the priority of the given semi-persistent uplink resource allocation.

At 1208, traffic is send based on the applying of the one or more priority rules. For example, the UE may perform the one or more scheduled transmissions using the semi-persistent uplink resource allocations that were selected at step 1206.

Figure 13:
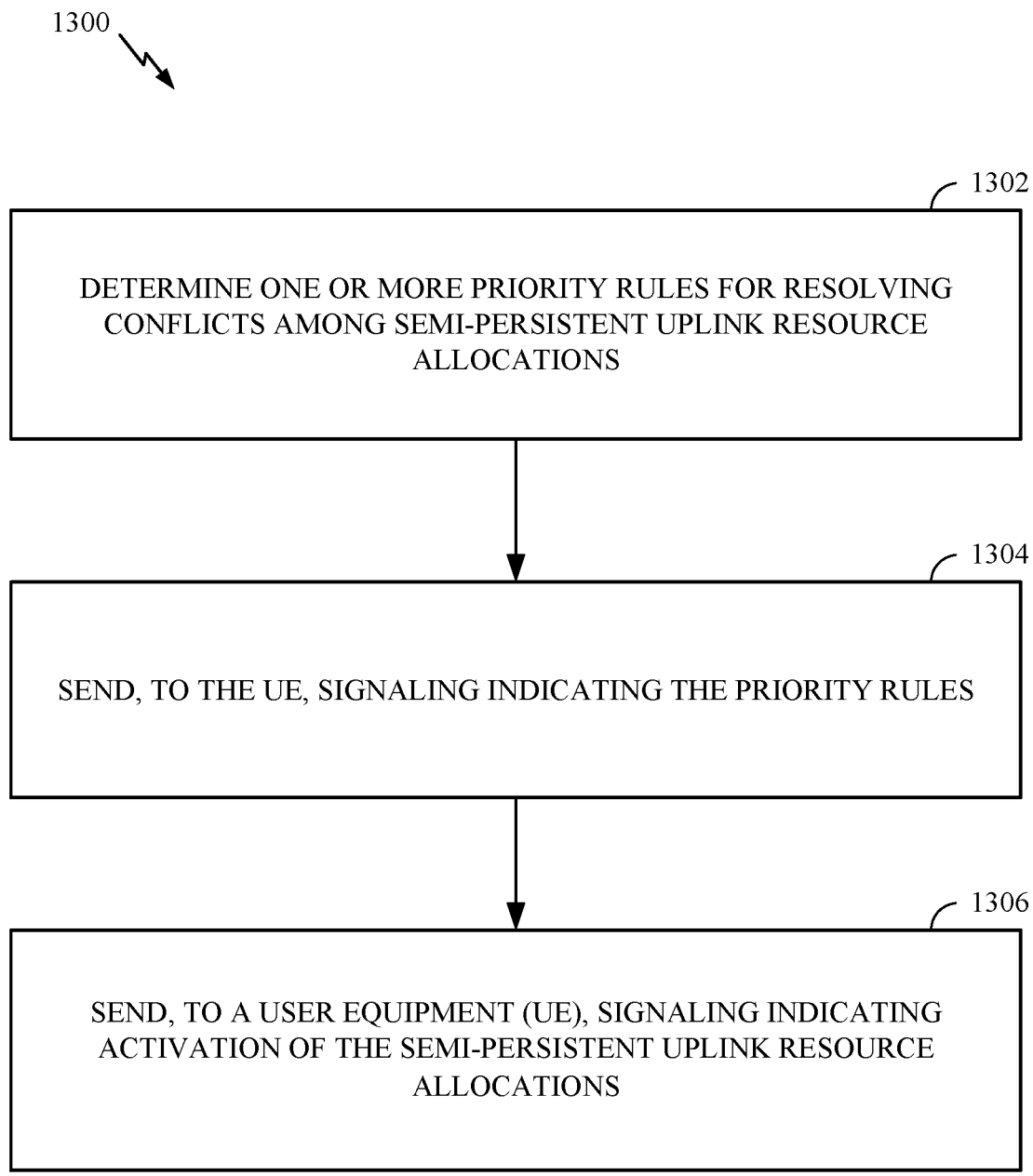
FIG. 13 illustrates example operations for wireless communications by a network entity, in accordance with certain aspects of the present disclosure.

FIG. 13 depicts example operations 1300 for wireless communications by a network entity, in accordance with certain aspects of the present disclosure. For example, operations 1300 may be performed by a base station, such as a BS 110 of FIG. 1.

At 1302, one or more priority rules for resolving conflicts among semi-persistent uplink resource allocations are determined. For example, the base station may determine the one or more priority rules based on configuration data.

At 1304, signaling indicating the one or more priority rules is sent to a UE. For example, the base station may send RRC signaling to the UE indicating the one or more priority rules.

At 1306, signaling indicating activation or deactivation of the semi-persistent uplink resource allocations is sent to the UE. For example, the base station may send PDCCH signaling with DCI to the UE indicating the activation or deactivation. In some embodiments, the signaling includes one or more identifiers associated with the semi-persistent resource allocations.

Figure 14:
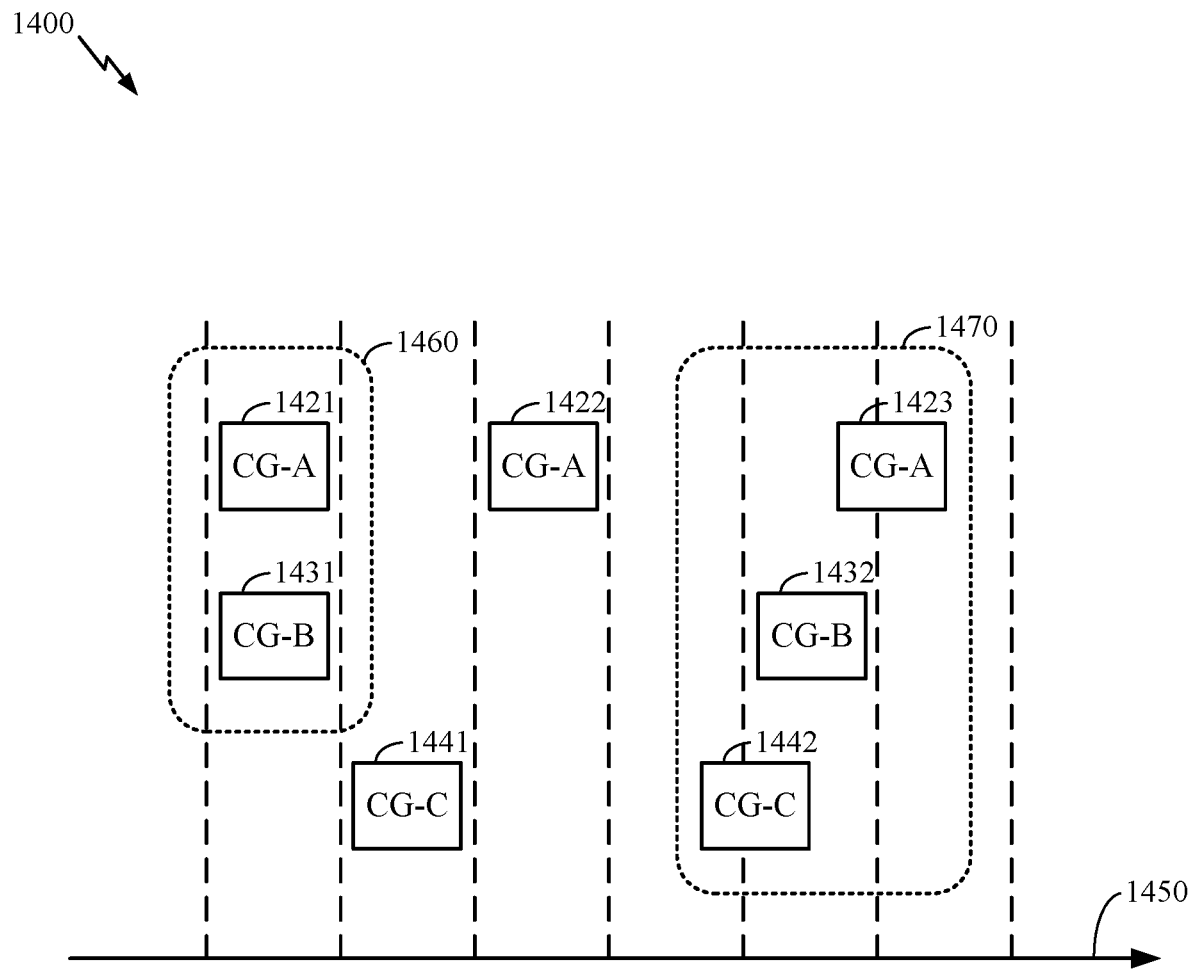
FIG. 14 illustrates an example of conflicts between scheduled uplink transmissions using semi-persistent uplink resource allocations that can be resolved according to techniques described herein.

FIG. 14 illustrates an example 1400 of conflicts between scheduled uplink transmissions using semi-persistent uplink resource allocations that can be resolved according to techniques described herein. For instance, example 1400 may represent scheduled transmissions using semi-persistent uplink resource allocations by a UE, such as UE 706 of FIG. 7 or a UE 120 of FIG. 1.

A first series of transmissions 1421, 1422, and 1423 are scheduled using a first configured grant (CG-A), a second series of transmissions 1431, 1432, and 1433 are scheduled using a second configured grant (CG-B), and a third series of transmissions 1441, 1442, and 1443 are scheduled using a third configured grant (CG-C). Example 1400 depicts scheduled transmissions over time 1450.

Example 1400 includes a first conflict 1460 between transmission 1421 using CG-A and transmission 1431 using CG-B. As shown, transmissions 1421 and 1431 are in conflict 1460 because they overlap in time 1450. Conflict 1460 is a periodic conflict because transmissions 1421 and 1431 overlap completely.

Conflict 1460 may be resolved by applying priority rules. For example, the UE may have received the priority rules from a base station. A priority rule may state, for example, that a conflict between a pair of transmissions is to be resolved by selecting the transmission on the CG with the highest priority. As such, the priorities of CG-A and CG-B may be determined. In some embodiments, the priorities of CG-A and CG-B may be determined based on signaling received from the base station indicating the priorities. In other embodiments, the priorities of CG-A and CG-B are determined based on priorities of logical channels associated with CG-A and CGB. Once the priorities are determined, the CG with the highest priority may be selected. For example, if it is determined that CG-A has a priority of 6 and CG-B has a priority of 2, then CG-A is selected. As such, conflict 1460 may be resolved by selecting transmission 1421. Transmission 1460 may be performed while transmission 1431 may be discarded or delayed.

Example 1400 includes a second conflict 1470 involving transmission 1423 using CG-A, transmission 1432 using CG-B, and transmission 1442 using CG-C. As shown, transmissions 1423, 1432, and 1442 are in conflict 1470 because they overlap in time 1450. Conflict 1470 is a non-periodic conflict because transmissions 1423, 1432, and 1442 overlap partially.

Conflict 1470 may also be resolved by applying priority rules (e.g., indicating that transmissions on CGs with higher priorities should be performed first, etc.). Conflict 1470 involves a set of transmissions 1423, 1432, and 1442 and includes two conflicts between subsets. As shown transmissions 1442 and 1432 (e.g., the first subset) are in conflict and transmissions 1432 and 1423 (e.g., the second subset) are in conflict. Simply resolving the subsets in order of time may not achieve the best results. Consider an example where CG-A has a priority of 8, CG-B has a priority of 2, and CG-C has a priority of 1. If the first subset (transmission 1442 using CG-C and transmission 1432 using CG-B) was resolved first, then CG-B would have the higher priority, and transmission 1432 would be selected. CG-C would be discarded, and transmission 1442 would not be performed. The second subset (transmission 1432 using CG-B and transmission 1423 using CG-A) would then be resolved by selecting CG-A and transmission 1423, discarding CG-B and transmission 1432. As such, this technique would only result in transmission 1423 being performed. As shown in example 1400, transmissions 1442 and 1423 do not overlap, so this technique would result in unnecessarily discarding transmission 1442. As such, priority rules may be used to optimize an order in which subsets are resolved when multiple subsets of transmissions are in conflict.

For example, a priority rule may state that an order of resolving subsets should be determined such that subsets including CGs with higher priorities should be resolved first (e.g., subsets are resolved in order of the highest-priority CG in each subset). As such, in the example discussed above where CG-A has a priority of 8, CG-B has a priority of 2, and CG-C has a priority of 1, the second subset (transmission 1432 using CG-B and transmission 1423 using CG-A) in conflict 1470 would be resolved first because CG-A has the highest priority and CG-A is in the second subset. The second subset would be resolved by selecting CG-A and transmission 1423 and discarding CG-B and transmission 1432. The first subset (transmission 1442 using CG-C and transmission 1432 using CG-B) would then be resolved by selecting CG-C and transmission 1442, because CG-B and transmission 1432 have already been discarded. As such, both transmission 1423 and transmission 1442 may be performed.

Figure 15:
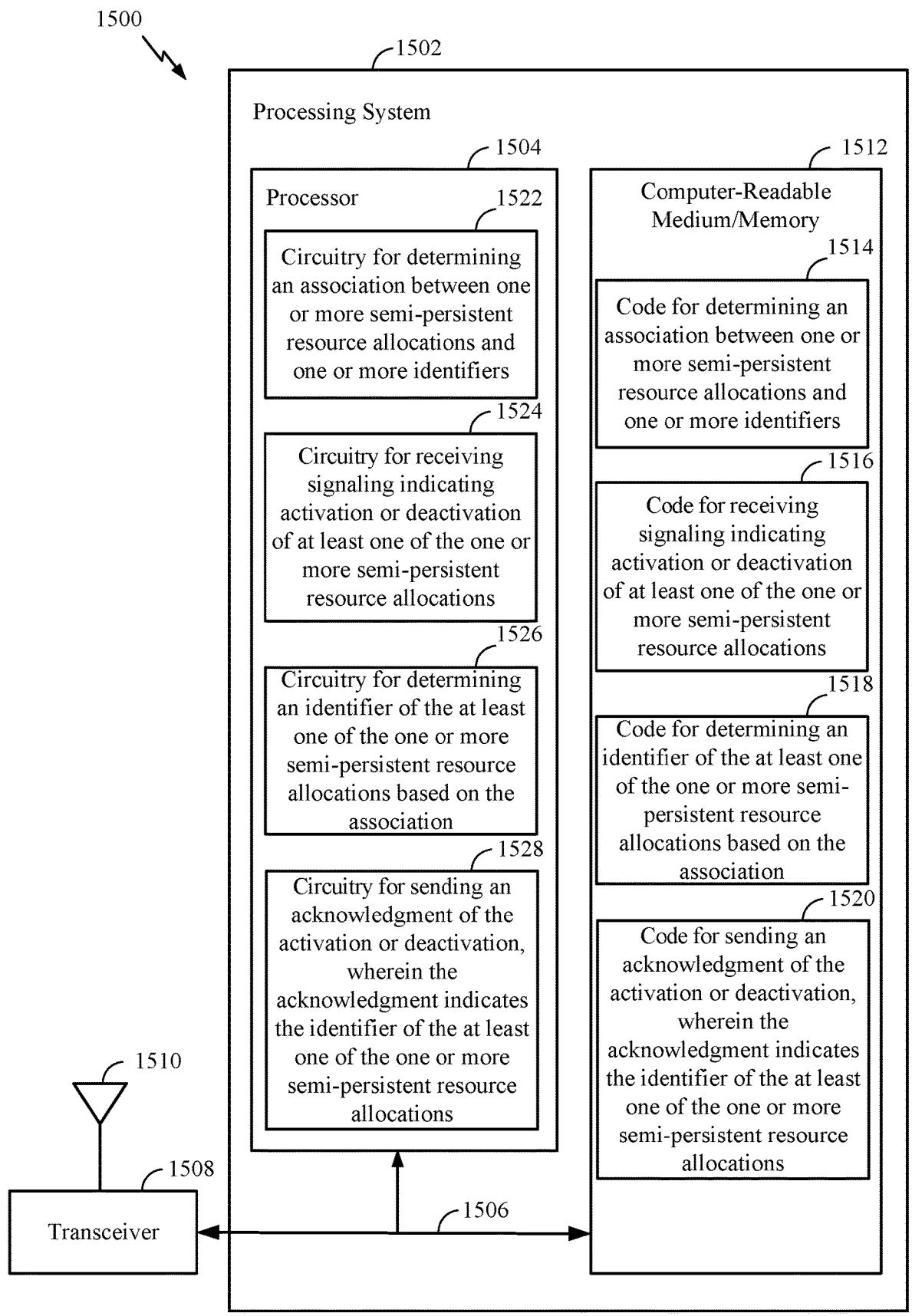
FIG. 15 illustrates a communications device that may include various components configured to perform operations for the techniques disclosed herein in accordance with aspects of the present disclosure.

FIG. 15 illustrates a communications device 1500 that may include various components (e.g., corresponding to means-plus-function components) configured to perform operations for the techniques disclosed herein, such as the operations illustrated in FIGS. 8, 10, and/or 12. The communications device 1500 includes a processing system 1502 coupled to a transceiver 1508 (e.g., a transmitter and/or a receiver). The transceiver 1508 is configured to transmit and receive signals for the communications device 1500 via an antenna 1510, such as the various signals as described herein. The processing system 1502 may be configured to perform processing functions for the communications device 1500, including processing signals received and/or to be transmitted by the communications device 1500.

The processing system 1502 includes a processor 1504 coupled to a computer-readable medium/memory 1512 via a bus 1506. In certain aspects, the computer-readable medium/memory 1512 is configured to store instructions (e.g., computer-executable code) that when executed by the processor 1504, cause the processor 1504 to perform the operations illustrated in FIGS. 8, 10, and/or 12 or other operations for performing the various techniques discussed herein for wireless communications by a user equipment (UE). In certain aspects, computer-readable medium/memory 1512 stores code 1514 for determining an association between one or more semi-persistent resource allocations and one or more identifiers; code 1516 for receiving signaling indicating activation or deactivation of at least one of the one or more semi-persistent resource allocations; code 1518 for determining an identifier of the at least one of the one or more semi-persistent resource allocations based on the association; and code 1520 for sending an acknowledgment of the activation or deactivation, wherein the acknowledgment indicates the identifier of the at least one of the one or more semi-persistent resource allocations.

In certain aspects, the processor 1504 has circuitry configured to implement the code stored in the computer-readable medium/memory 1512. The processor 1504 includes circuitry 1522 for determining an association between one or more semi-persistent resource allocations and one or more identifiers; circuitry 1524 for receiving signaling indicating activation or deactivation of at least one of the one or more semi-persistent resource allocations; circuitry 1526 for determining an identifier of the at least one of the one or more semi-persistent resource allocations based on the association; and circuitry 1528 for sending an acknowledgment of the activation or deactivation, wherein the acknowledgment indicates the identifier of the at least one of the one or more semi-persistent resource allocations.

Figure 16:
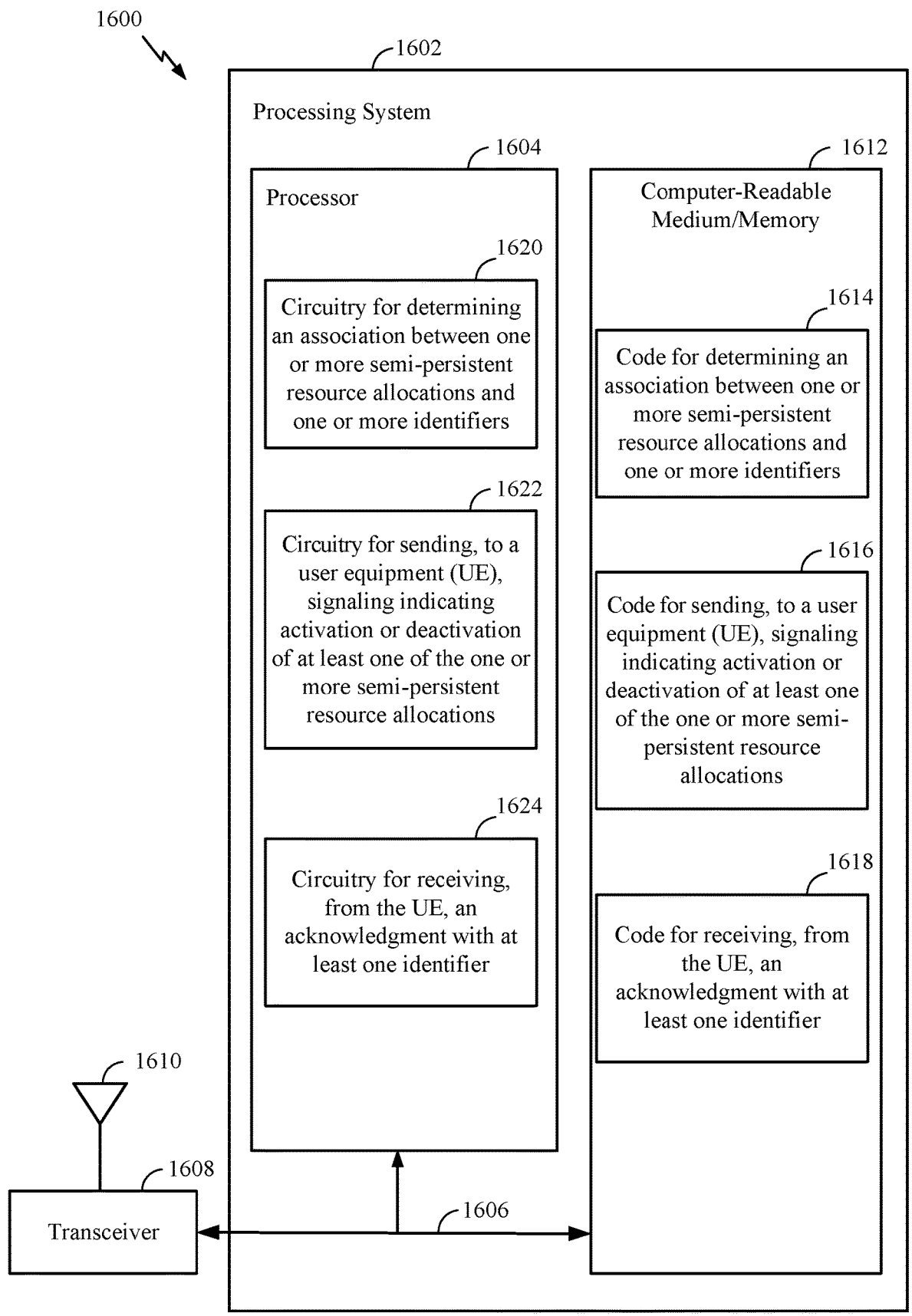
FIG. 16 illustrates a communications device that may include various components configured to perform operations for the techniques disclosed herein in accordance with aspects of the present disclosure.

FIG. 16 illustrates a communications device 1600 that may include various components (e.g., corresponding to means-plus-function components) configured to perform operations for the techniques disclosed herein, such as the operations illustrated in FIGS. 9, 11, and/or 13. The communications device 1600 includes a processing system 1602 coupled to a transceiver 1608 (e.g., a transmitter and/or a receiver). The transceiver 1608 is configured to transmit and receive signals for the communications device 1600 via an antenna 1610, such as the various signals as described herein. The processing system 1602 may be configured to perform processing functions for the communications device 1600, including processing signals received and/or to be transmitted by the communications device 1600.

The processing system 1602 includes a processor 1604 coupled to a computer-readable medium/memory 1612 via a bus 1606. In certain aspects, the computer-readable medium/memory 1612 is configured to store instructions (e.g., computer-executable code) that when executed by the processor 1604, cause the processor 1604 to perform the operations illustrated in FIGS. 9, 11, and/or 13 or other operations for performing the various techniques discussed herein for wireless communications by a user equipment (UE). In certain aspects, computer-readable medium/memory 1612 stores code 1614 for determining an association between one or more semi-persistent resource allocations and one or more identifiers; code 1616 for sending, to a user equipment (UE), signaling indicating activation or deactivation of at least one of the one or more semi-persistent resource allocations; and code 1618 for receiving, from the UE, an acknowledgment with at least one identifier.

In certain aspects, the processor 1604 has circuitry configured to implement the code stored in the computer-readable medium/memory 1612. The processor 1604 includes circuitry 1620 for determining an association between one or more semi-persistent resource allocations and one or more identifiers; circuitry 1622 for sending, to a user equipment (UE), signaling indicating activation or deactivation of at least one of the one or more semi-persistent resource allocations; and circuitry 1624 for receiving, from the UE, an acknowledgment with at least one identifier.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, various operations shown in FIGS. 8-13 may be performed by various processors shown in FIG. 4. More particularly, operations 900, 1100, and 1300 of FIGS. 9, 11, and 13 may be performed by processors 420, 460, 438, and/or controller/processor 440 of the BS 110 shown in FIG. 4 while operations 800, 1000, and 1200 of FIGS. 8, 10, and 12 may be performed by one or more of processors 466, 458, 464, and/or controller/processor 480 of the UE 120.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 8-13.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:
   determining associations between two or more semi-persistent resource allocations and two or more identifiers;
   receiving a single instance of downlink control information (DCI) signaling indicating joint activation or deactivation of at least two of the two or more semi-persistent resource allocations;
   determining identifiers of the at least two of the two or more semi-persistent resource allocations based on the associations; and
   sending an acknowledgment of the joint activation or deactivation, wherein the acknowledgment indicates the identifiers of the at least two of the two or more semi-persistent resource allocations.

2. The method of claim 1, wherein the single instance of DCI signaling indicating the joint activation or deactivation comprises physical downlink control channel (PDCCH) signaling.

3. The method of claim 2, wherein the single instance of DCI signaling comprises a group identifier associated with a subset of the two or more semi-persistent resource allocations.

4. The method of claim 1, wherein the method further comprises:
receiving signaling indicating the association, wherein the signaling indicating the association comprises one or more of: radio resource control (RRC) signaling; or a medium access control (MAC) control element (CE).

5. The method of claim 1, wherein the acknowledgment is sent via a medium access control (MAC) control element (CE).

6. The method of claim 1, wherein the acknowledgment is indicated via a bitmap that indicates the at least two of the two or more semi-persistent resource allocations.

7. The method of claim 1, wherein the two or more identifiers are either cell group wide identifiers or cell specific identifiers.

8. A method for wireless communications by a user equipment (UE), comprising:
determining associations between two or more semi-persistent uplink resource allocations and one or more logical channels;
receiving a single instance of downlink control information (DCI) signaling indicating joint activation of at least two of the two or more semi-persistent uplink resource allocations; and
determining a priority of sending traffic on the one or more logical channels using a resource of the at least two of the two or more semi-persistent uplink resource allocations, based on the association and the activation.

9. The method of claim 8, wherein the single instance of DCI signaling indicating the joint activation comprises physical downlink control channel (PDCCH) signaling.

10. The method of claim 9, wherein the single instance of DCI signaling comprises a bitmap indicating the at least two of the two or more semi-persistent uplink resource allocations.

11. The method of claim 9, wherein the single instance of DCI signaling comprises a group identifier associated with a subset of the two or more semi-persistent uplink resource allocations.

12. The method of claim 8, wherein the method further comprises:
receiving signaling indicating the association, wherein the signaling indicating the association comprises one or more of: radio resource control (RRC) signaling; or a medium access control (MAC) control element (CE).

13. The method of claim 8, wherein determining the priority comprises prioritizing the traffic for the one or more logical channels associated with the activated at least two of the one or more semi-persistent uplink resource allocations when sending traffic on the one or more logical channels using the resource of the at least two of the two or more semi-persistent uplink resource allocations.

14. The method of claim 8, wherein the determined priority calls for communicating traffic for a given logical channel only using semi-persistent uplink resource allocations that are associated with the given logical channel.

15. The method of claim 8, wherein the method further comprises:
determining identifiers of the at least two of the two or more semi-persistent uplink resource allocation; and
sending an acknowledgment of the joint activation, wherein the acknowledgment indicates the identifiers of the at least two of the two or more semi-persistent uplink resource allocations.

16. A method for wireless communications by a network entity, comprising:
determining associations between two or more semi-persistent resource allocations and two or more identifiers;
sending, to a user equipment (UE), a single instance of downlink control information (DCI) signaling indicating joint activation or deactivation of at least two of the two or more semi-persistent resource allocations; and
receiving, from the UE, an acknowledgment of the joint activation or deactivation with at least two identifiers.

17. The method of claim 16, wherein the method further comprises confirming that the UE received the single instance of DCI signaling indicating the joint activation or deactivation by determining, based on the association, that the at least two identifiers correspond to the at least two of the two or more semi-persistent resource allocations.

18. A user equipment (UE) configured for wireless communication, comprising:
a memory comprising computer-executable instructions; and one or more processors configured to execute the computer-executable instructions and cause the UE to:
determine associations between two or more semi-persistent resource allocations and two or more identifiers;
receive a single instance of downlink control information (DCI) signaling indicating joint activation or deactivation of at least two of the two or more semi-persistent resource allocations;
determine identifiers of the at least two of the two or more semi-persistent resource allocations based on the associations; and
sending an acknowledgment of the joint activation or deactivation, wherein the acknowledgment indicates the identifiers of the at least two of the two or more semi-persistent resource allocations.

19. The UE of claim 18, wherein the single instance of DCI signaling indicating the joint activation or deactivation comprises physical downlink control channel (PDCCH) signaling.

20. The UE of claim 19, wherein the single instance of DCI signaling comprises a group identifier associated with a subset of the two or more semi-persistent resource allocations.

21. The UE of claim 18, wherein the one or more processors configured to execute the computer-executable instructions further cause the UE to:
receive signaling indicating the association, wherein the signaling indicating the association comprises one or more of: radio resource control (RRC) signaling; or a medium access control (MAC) control element (CE).

22. The UE of claim 18, wherein the acknowledgment is sent via a medium access control (MAC) control element (CE).

23. The UE of claim 18, wherein the acknowledgment is indicated via a bitmap that indicates the at least two of the two or more semi-persistent resource allocations.

24. The UE of claim 18, wherein the two or more identifiers are either cell group wide identifiers or cell specific identifiers.

* * * * *